United States Patent [19]

Yoshioka et al.

[11] Patent Number: 4,880,792
[45] Date of Patent: Nov. 14, 1989

[54] MOLDING INSTALLATION USING DIE

[75] Inventors: Kenichiro Yoshioka; Hironori Hisamitsu, both of Hiroshima, Japan

[73] Assignee: Mazda Motor Corporation, Hioshima, Japan

[21] Appl. No.: 117,224

[22] Filed: Nov. 5, 1987

[30] Foreign Application Priority Data

| Nov. 6, 1986 | [JP] | Japan | 61-262717 |
| Nov. 6, 1986 | [JP] | Japan | 61-262719 |
| Nov. 6, 1986 | [JP] | Japan | 61-262721 |
| Nov. 6, 1986 | [JP] | Japan | 61-262722 |
| Nov. 20, 1986 | [JP] | Japan | 61-278416 |
| Nov. 20, 1986 | [JP] | Japan | 61-179288[U] |
| Dec. 24, 1986 | [JP] | Japan | 61-306213 |

[51] Int. Cl.$^4$ .......................................... B29C 45/03
[52] U.S. Cl. .......................................... 425/190; 72/342; 100/918; 164/150; 164/338.1; 164/339; 164/342
[58] Field of Search ............... 425/190, 193, 150, 195, 425/547, 342, 448, 135; 100/918; 164/137, 150, 342, 339, 338.1; 72/342, 446, 448, 466, 481

[56] References Cited

U.S. PATENT DOCUMENTS

| 3,455,141 | 7/1969 | Bracco et al. | 72/466 |
| 3,545,039 | 12/1970 | Duckett | 425/195 |
| 3,945,230 | 3/1976 | Tomioka et al. | 72/448 |
| 4,433,620 | 2/1984 | Kiyosawa | 72/466 |
| 4,462,783 | 7/1984 | Hehl | 425/190 |
| 4,472,127 | 9/1984 | Cyriax et al. | 425/190 |
| 4,544,340 | 10/1985 | Hehl | 425/190 |
| 4,601,422 | 7/1986 | Dumarque et al. | 72/448 |
| 4,698,007 | 10/1987 | Hehl | 425/190 |
| 4,737,095 | 4/1988 | Hehl | 425/190 |
| 4,758,147 | 7/1988 | Inaba | 100/918 |
| 4,758,147 | 7/1988 | Inaba | 425/190 |

Primary Examiner—Willard Hoag
Attorney, Agent, or Firm—Wegner & Bretschneider

[57] ABSTRACT

The molding installation includes a molding apparatus adapted to effect the molding with a die; a stocker adapted to store the die; a carriage having a table with the die loaded thereon, the stocker being adapted to exchange the die for another in the molding apparatus and disposed on a passage connecting between the molding apparatus and the stocker; a die transferring mechanism mounted on the molding apparatus and adapted to transfer the die between the molding apparatus and the carriage; and another die transferring mechanism mounted on the carriage and adapted to transfer the die between the carriage and the stocker.

The arrangement for the die transferring mechanism on the carriage avoids a provision of a die transferring mechanism on each stocker, thus making the die transferring mechanism on the carriage a smaller size, reducing an inertia thereof, leading to a speed-up of operation thereby, enabling a rapid suspension thereof and rendering a molding cycle more efficient.

And the arrangement for the die transferring mechanism on the molding apparatus permits a provision of the molding apparatus away from a passage for the carriage because the die is conveyed into or from the molding apparatus by its own die transferring mechanism. This also causes no problem with making the molding apparatus a larger size and provides a wide space around the molding apparatus for the maintenance area.

19 Claims, 29 Drawing Sheets

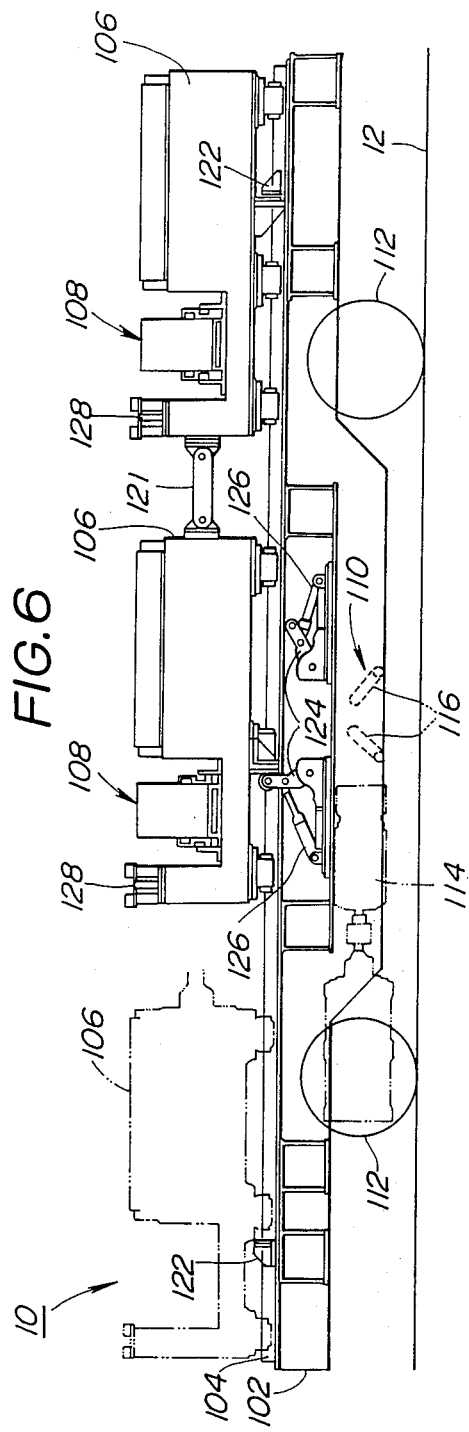
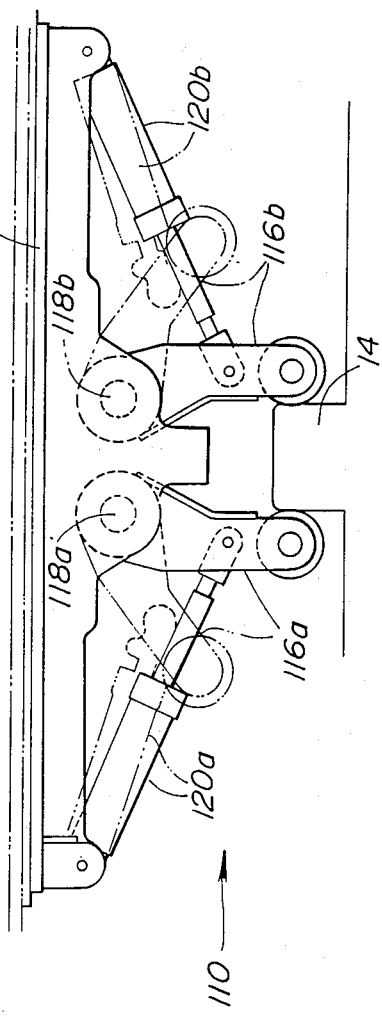

FIG.16
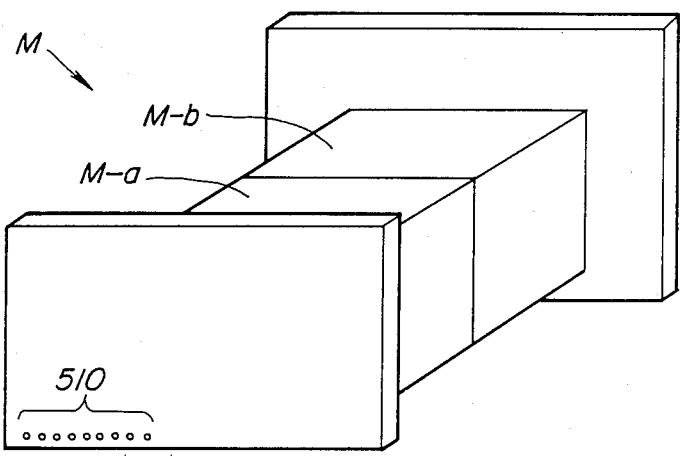
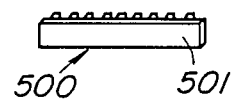
FIG.17
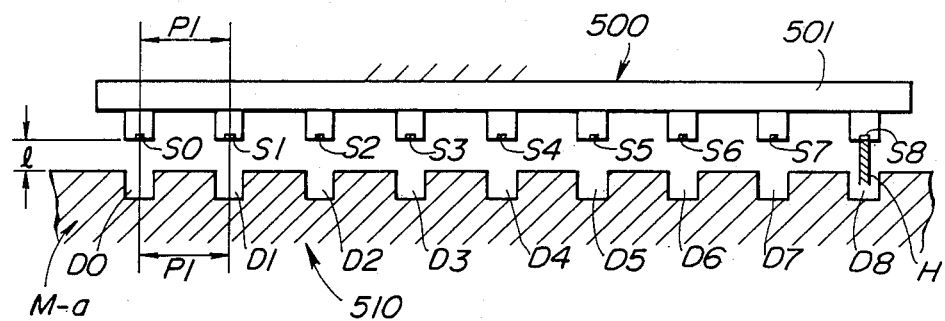

MOLDING INSTALLATION USING DIE

BACKGROUND OF THE INVENTION

1. Field of the Invention

The present invention relates to a molding installation using a die and, more particularly, to an automatic molding installation or the like having a layout suitable for automation of a die exchanging operation, a die conveying operation of a die to be set in a molding apparatus and so on.

2. Description of the Prior Art

Conventional molding equipment using a die includes one, for example, for a metal mold casting, a press molding, and a plasstic molding. As a plastic molding is known an injection molding, a compression molding, a blow molding and so on.

Molding apparatuses of various types for those moldings are known to those skilled in the art and they require a lot of time and labor in a die exchanging operation. A die is so heavy that it is very difficult and risky to exchange the die using labors only.

Heretofore, various methods have been employed for exchanging a die for an old one in a molding apparatus. For example, Japanese Utility Model Publication No. 2,537/1983 discloses a die exchange using a crane. This technology would be effective in an automatic conveyance of the die to the molding apparatus from a stocker in which the die has been stored although it would be effectively applicable to the die exchanging operation. The disadvantage prevailing in these technology using a crane system, however, underlies in the fact that a long time of labor work involving risk is inevitably required for hoisting dice with cranes.

Different technology is disclosed in Japanese Utility Model Publication Nos. 2,537/1983 and 5,557/1984, Japanese Patent Publication (Laid-Open) No. 48,132/1984 (Japanese counterpart of West German P3 222 743.4 and P3 242 169.9) and Japanese Patent Publication (Laid-Open) No. 201,624/1983 (Japanese counterpart of West German G8 212 045 and P3 220 911.8). These technology are directed to methods of exchanging a die through a table disposed on the side of a molding apparatus. This technology has the advantage that the die can be exchanged in a state of being loaded on the table without labor as required for conventional crane systems, thus leading to a stable die exchanging operation. It is to be noted that this technology is of some help to automating a die exchanging operation for a molding apparatus.

The Japanese Patent Publication (Laid-Open) No. 48,132/1984 and Japanese Patent Publication (Laid-Open) No. 201,624/1983 disclose an arrangement for a die conveyance means in a molding apparatus or on a die loading base in such a manner that a die is transferred between the molding apparatus and the die loading base through the die conveyance means.

It is to be understood that there is the merit that a series of the die exchanging operation can be automated in terms of the provision of stockers in instances where a die conveying carriage having a table with a die loaded thereon is disposed so as to connect the molding apparatus to the stockers.

In designing such a molding installation, it is desirable to dispose a maintenance area around the molding apparatus. From this reason, it is not preferred to arrange for a passage for the die conveying carriage close to the molding apparatus even when the die is withdrawn from the stocker using the die conveying carriage and the die exchange in the molding apparatus is carried out using it. For the arrangement as disclosed in those prior patent applications, it is designed that the conveyance means should be disposed capable of transferring the die in such a long distance as reaching both the stocker and the molding apparatus when the die is transferred from the stocker to the molding apparatus or vice versa using such a conventional conveyance means. The conventional conveyance means, accordingly, is rendered of a larger size and heavier weight as a matter of course. In the conventional arrangement where no maintenance area is disposed, a passage for the die conveying carriage can be arranged adjacent to stockers. However, a die conveyance means for introducing a die thereinto or withdrawing it therefrom should be mounted to each of a number of stockers, leading to a considerable expensive investment.

Recently, there has been particularly strong demands for an efficient die exchange operation. In particular, production of many different types of products in smaller quantities is currently in demand so that the number of the die exchanging operation has been required to be minimized and the die exchanging operation can be carried out as quick as possible without causing errors in exchanging a fresh die for an old one. In the event that a wrong die is introduced into the molding apparatus, the die may be caused to strike against the molding apparatus damaging both the die and the molding apparatus.

In automating an overall layout of a molding installation, an automation of a molded product withdrawing means should be taken into account. For a mold product withdrawing system, a molded product grip member for withdrawing a molded product from the molding apparatus should be exchanged in accordance with a predetermined type of the molded product in association with the exchange of a die adapted to form the predetermined mold product. As means on which the mold product grip member is loaded may be used an arm member. Such an arm member, however, presents the difficulty and complexity in its control system. The control system should contain a control of a position of suspension of the mold product grip member upon exchanging, a position of the arm member at the time of holding the molded product and movements relative to these control, thus rendering the control system complicated. It is also necessary to exchange a molded product grip member for another as quick as possible without errors as with the die exchanging operation.

When a plastic injection molding apparatus is employed as the molding apparatus, the gate cutting should be effected rapidly in order to shorten a molding cycle. In this case, an appropriate adjustment of clamping the die at the time of the gate cutting is essential.

SUMMARY OF THE INVENTION

Therefore, the present invention has an object to provide a molding installation using a die with the arrangement that an overall automation can be made efficiently.

The present invention has another object to provide a molding installation that is designed such that a series of exchanging operations such as a die exchanging operation and so on can be conducted rapidly without errors.

The present invention has a further object to provide a molding installation that is adapted to be suitable for production of small quantities of a variety of molded products and shorten a molding cycle.

The present invention has a still further object to provide a molding installation that is adapted to simplify a control system required for a full automation.

Accordingly, in one aspect the present invention comprises a a molding apparatus for effecting the molding using a die; a stocker adapted to store the die; a conveying carriage adapted to exchange the die in the molding apparatus, running on a passage connecting between the molding apparatus and the stocker and having a table loading the die thereon; a die conveying means mounted on the molding apparatus and adapted to deliver or receive the die to or from the die conveying carriage; and a die conveying means mounted on the die conveying carriage and adapted to deliver or receive the die to or from the stocker.

In this aspect of the present invention, the die is transferred between the molding apparatus between the first conveying carriage by means of a die conveyance means arranged on the molding apparatus while the die is transferred between the first conveying carriage and the stocker by means of a die conveyance means arranged on the first conveying carriage. This arrangement can avoid a provision of such a die conveyance means on each of the stockers.

In another aspect, it is preferred that a transferal of the die between the die temperature adjusting apparatus and the first conveying carriage is made by means of the die conveyance means arranged on the first conveying carriage in instances where a molding cycle can be shortened by pre-heating the die prior to conveyance into the molding apparatus. This arrangement can further avoid a provision of such a die conveyance means on the die temperature adjusting apparatus.

In accordance with the present invention, a conveyance of the die from or into the molding apparatus is arranged to be done by the die conveyance means disposed on the molding apparatus. Accordingly, it presents the advantage when it should be rendered of a larger size.

In a further aspect of the present invention, an intermediate table may be preferably arranged between the molding apparatus and the first conveying apparatus without rendering the first conveying carriage of an unnecessarily larger size. In this case, the molding apparatus may be arranged in a distance from first conveying carriage and a sufficiently wide area of a maintenance area may be disposed around the molding apparatus.

That the first conveying carriaage is not rendered in an unnecessarily larger size presents the advantages in designing a die conveyance means to be disposed on the first conveying carriage because no attention should be paid to a conveyance of the die into or from the molding apparatus, thus enabling a minituarization of the die conveyance means. This also leads to rendering the first conveying carriage so lightweight that an inertia of the first conveying carriage becomes smaller, its running speed goes up and it can be stopped rapidly, thus rendering a molding cycle more efficient.

In a still further aspect, the present invention is preferably arranged such that the molding apparatus is provided with a first plate and a second plate in such a manner that the die or mold constituted by a front mold as a fixed side portion and a rear mold as a movable side portion of the mold is introduced into a space between the first and second plates with the mold half loaded on the side of the first plate and the other half loaded on the side of the second plate and that the second plate is operatively driven closer to or far away from the first plate by a drive means; and the molding apparatus is further provided with a plate space controlling means and a die thickness detecting means in such a manner that a conveyance of the die into the molding apparatus is suspended when a die thickness of the die detected by the die thickness detecting means is larger than a value preset in accordance with the type of the die; said plate space controlling means for controlling the space between the first and second plates of the molding apparatus being driven by said drive means so as to become a value preset prior to conveyance of the die thereinto in accordance with a type of the die to be conveyed into the space between the first and second plates; said die thickness detecting means for detecting a die thickness of the die in the course of conveyance into the space of the first and second plates thereof.

This arragnement in this aspect of the invention serves as prevention against damages of the molding apparatus and the die itself upon a collision for reasons that the front and the rear molds constituting the die is caused to open during a course of conveyance by means of the first conveying carriage or transferal of the die therefrom. This arrangement can be likewise applicable to the die temperature adjusting apparatus.

In a still further aspect, the present invention is preferably arranged such that the molding apparatus is further provided with a first plate and a second plate in such a manner that the die constituted by the mold halves is introduced into a space between the first and second plates with the one mold half loaded on the side of the first plate and the other half loaded on the side of the second plate and that the second plate is operatively driven closer to or far away from the first plate by a drive means; and the molding apparatus is further provided with a plate space controlling means, a first die type detecting means and a discrimation means in such a manner that a conveyance of the die into the molding apparatus is suspended when a die type of the die detected by the first die type detecting means is larger than a value preset in accordance with the type of the die; said plate space controlling means for controlling the space between the first and second plates of the molding apparatus being driven by said drive means so as to become a value preset prior to conveyance of the die thereinto in accordance with a type of the die to be conveyed into the space between the first and second plates; said first die type detecting means for detecting a die type of the die in the course of conveyance into the space of the first and second plates thereof; and said discrimination means for discriminating whether or not the die in the course of conveyance corresponds to a preset type of the die in reponse to a signal from said first die type detecting means.

In this aspect of the present invention, a wrong type of the die is prevented from being conveyed into the molding apparatus in a course of conveyance. This arrangement can also serve as rendering an efficiency in the die loading operation in terms of permitting an adjustment of the die space so as to comply with a type of the die to be loaded while the die is being conveyed and enabling detection of the type of the die prior to conveyance into the space of the two plates. This arrangement is also applicable to the die temperature adjusting apparatus.

In a still further aspect of the present invention, the first conveying carriage may be further provided preferably with a second die type detecting means in such a manner that a dection result from the second die type detecting means can be compared to the preset type of the die. This arrangement can ensure a detection of the type of the die to a more accurate extent than where only one detecting means is provided.

In another further aspect of the present invention, a molded product withdrawing apparatus may be preferably arranged along the molding apparatus for the purpose to withdraw the molded product from the molding apparatus. This arrangement serves as automation of the loading of a grip member for holding the molded product or a work on a grip member exchanging apparatus because the loading of the grip member can be effected in such a state of an arm member being suspended at a predetermined position. In this aspect, the relative positioning of the grip member with respect to the arm member can be mechanically effected with more readiness and simpleness in mutual association of a support base supporting the grip member thereon in such a manner as movable to a slight extent with a position lifter for positioning and lifting the support base and a guide pin for the grip member. This arrangement is likewise applicable to the die temperature adjusting apparatus and to a general apparatus with a member to be exchanged.

In another further aspect, the present invention is preferably arranged such that the grip member is provided with an identification mark for identifying a type of the grip member and the arm member is provided with a read-out means for reading out the identification mark, thus preventing a wrong type of the grip member from being loaded. It is preferred that the identification mark arranged on the grip member is employed as an operation data input means for the molded product withdrawing apparatus. This avoids an input of operation data in accordance with all types of grip members. This arrangement is likewise applicable to the die temperature adjusting apparatus and to a general apparatus with a member to be exchanged.

In a still further aspect of the present invention where a plastic injection molding apparatus is used, a clamping force at the time of the gate cutting may be preferably adjusted using a toggle mechanism. This permits an accurate adjustment of the clamping force at the time of the gate cutting, thus contributing to an improvement in a molding cycle. This arrangement can also be applied to the plastic injection molding apparatus alone, reducing errors arising upon the gate cutting to a remarkable extent.

Other objects and advantages of the present invention will become apparent in a course of the description which follow with reference to the drawings attached hereto. It is further noted that various modifications and variations can be made readily from the embodiments which follow and should be construed as being encompassed within the scope of the present invention.

BRIEF DESCRIPTION OF THE DRAWINGS

FIG. 6 is a side view illustrating a first conveying carriage in a molding area of the molding installation.

FIG. 7 is an enlarged side view illustrating a clamp mechanism of the first conveying carriage.

FIG. 16 is a perspective view illustrating identification marks indicating types of dice formed on a die and a die type detecting mechanism.

FIG. 17 is a partially sectional plane view illustrating details of the identification marks and the die type detecting mechanism.

FIGS. 23 to 25 are views illustrating the second embodiment, in which:

FIG. 23 is a diagrammatical representation illustrating an overall layout of the second embodiment;

FIG. 24 is a side view illustrating the position of a die type detecting mechanism; and FIG. 25 is a block diagram illustrating conveyance of a die into the molding apparatus.

FIGS. 26 to 28 are views illustrating the third embodiment, in which:

FIG. 26 is a plane view illustrating a relation of the die loaded on the first conveying carriage with fixed and movable plates of a preparatory temperature adjusting apparatus; and FIG. 27 is a side view illustrating a detector mechanism in the third embodiment.

FIG. 28 is a front view of FIG. 27.

FIGS. 29 to 31 are views illustrating the fourth embodiment, in which:

FIG. 29 is a cross-sectional side view of an injection molding apparatus:

FIG. 30 is an enlarged cross-sectional view of a portion of FIG. 29, showing specifically a slide core; and FIG. 31 is a partially cross-sectional side view illustrating toggle joints of the injection molding apparatus.

FIGS. 32 to 41 are views illustrating the fifth embodiment, in which:

FIG. 32 is a top view illustrating a position of a work grip member exchanging apparatus vs. a molded product withdrawing line;

FIG. 33 is a front view of FIG. 32, showing specifically a hand member;

FIG. 34 is a side view illustrating an operation of the hand member for withdrawal of a molded product and a work grip member exchanging apparatus;

FIG. 35 is a side view illustrating the work grip member exchanging apparatus;

FIG. 36 is a plane view illustrating a work grip member;

FIG. 37 is a plane view illustrating a support base of the work grip member exchanging apparatus;

FIG. 38 is a partially cross-sectional side view illustrating an upper chuck plate of the work grip member;

FIG. 39 is a plane view illustrating the upper chuck plate with identification marks:

FIG. 40 is a plane view illustrating a detection mechanism; and

FIG. 41 is a block diagram illustrating an operation of a new work grip member vs. the hand member.

DETAILED DESCRIPTION OF THE PREFERRED EMBODIMENTS

The present invention will be described below more in detail by way of embodiments with reference to the drawings attached hereto.

FIRST EMBODIMENT

Figure 1:
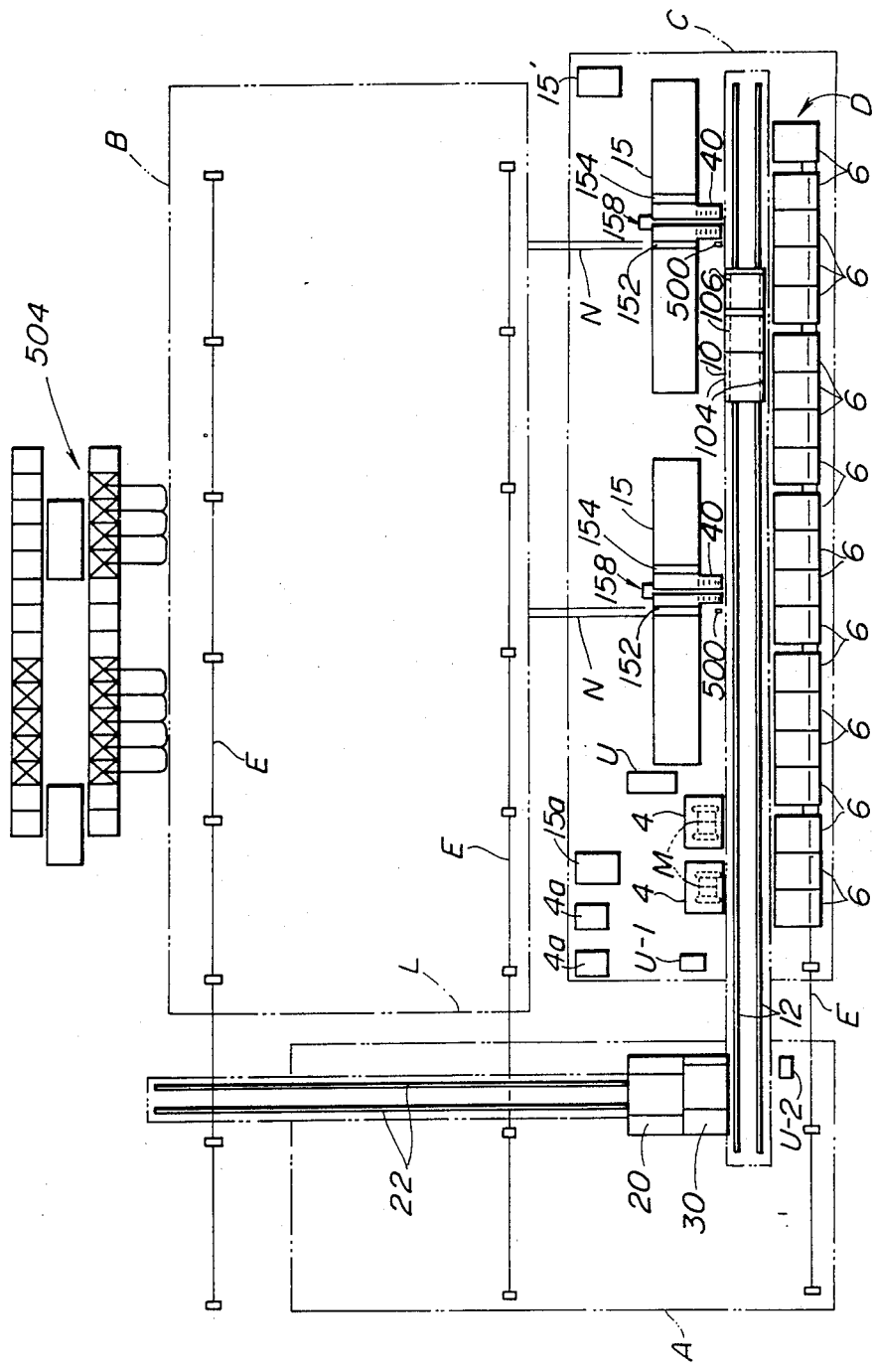
FIG. 1 is a diagrammatical plane view illustrating an overall layout of a molding installation according to the present invention.

As shown in FIG. 1, reference symbol A denotes a maintenance area for dies, reference symbol B denotes a storage area for old dies, reference symbol C denotes a molding area, and reference symbol D is a stock area for storing dice.

In the molding area C are disposed two transverse injection molding apparatuses 15, 15 and two preparatory temperature adjusting apparatuses 4, 4 are disposed close to the stock area D where a series of stockers, referred to generally as 6, are disposed, each of which is designed to accommodate therein one set of a die constituted by a front mold or a fixed side portion of a mold and a rear mold or a movable half portion of the mold. Between the molding area C and the stock area D is arranged a passage for a first conveying carriage 10.

The first conveying carriage 10 servess as transferal of the die between the stock area D and the molding area C or as conveyance of the die in the molding area C for transferal from the stock area through the preparatory temperature adjusting apparatus 4 to the molding apparatus 15 or for transferal between the molding area C and the maintenance area A.

Next to the molding area C is arranged the maintenance area A, and a die position shifting apparatus 30 is disposed therebetween. The die position shifting apparatus 30 is designed to shift a die position of the die transferred from the first conveying carriage 10 in the molding area C to the position thereof required to be taken in the maintenance area A and deliver it to a second conveying carriage 20 in the maintenance area A or vice versa. The second conveying carriage 20 is operatively driven on a passage built in the maintenance area A for the purpose to convey the die between the die position shifting apparatus 30 and the maintenance area A.

The first conveying carriage 10, on the one hand, is designed such that a set of a die or mold consisting of a front mold and a rear mold is loaded in a position or state of the front and rear mold halves being juxtaposed or placed side by side, viz., in a state of juxtaposition. This die position is ready for transferal of the die between the molding apparatus 15 of the transverse type. The second conveying carriage 20, on the other, is designed to allow the set of the front mold and the rear mold to be loaded in such a position that each of the front and rear molds, whichever is required for maintenance, comes on the top of the other that is not required for maintenance. Maintenance work is done in the maintenance area A always in such a manner that what is required for maintenance is placed above what is not required therefor.

The molding area C is further provided with a first warm water adjusting apparatus 4a for adjusting warm water to be supplied to the preparatory temperature adjusting apparatuses 4, 4, a second warm water adjusting apparatus 15a for adjusting warm water to be supplied to the transverse injection molding apparatuses 15, 15. Furthermore, the molding area C is also provided with a central control unit U for controlling the transverse injection molding apparatuses 15, 15 and the second warm water adjusting apparatus 15a, a preparatory temperature adjusting control unit U-1 for controlling the preparatory temperature adjusting apparatuses 4, 4 and the first warm water adjusting apparatus 4a, and a control unit U-2 for controlling the first conveying carriage 10 and the die position shifting apparatus 30. The control units U-1 and U-2 are designed to subject the first conveying cariage 10 and so on to automatic control in association with each other in response to a signal from the central control unit U.

Furthermore, the molding area C is provided with a molded product conveying line L on the side opposite to the passage for the first conveying carriage 10, and the molded product conveying line L is connected to the molding apparatuses 15, 15 through a molded product withdrawing lines N, N.

SECOND CONVEYING CARRIAGE (FIGS 2 AND 3)

Figure 2:
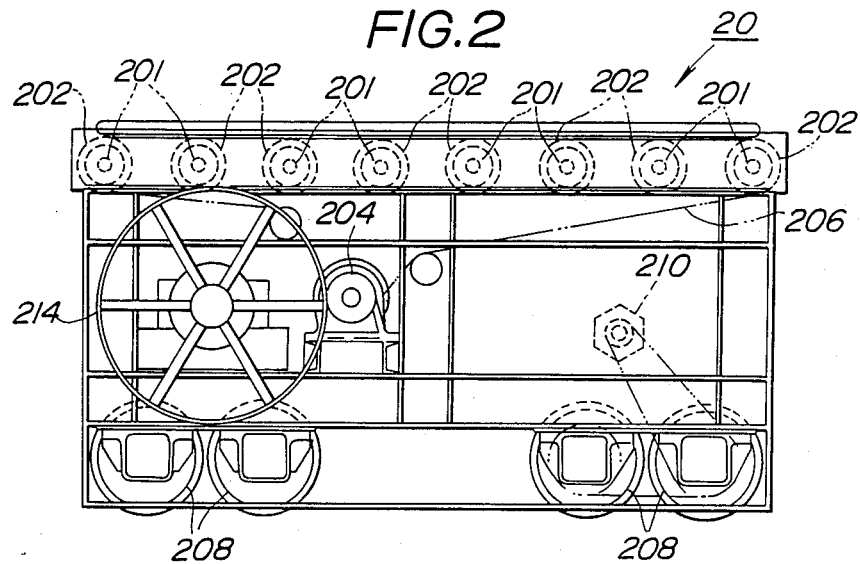
FIG. 2 is a side view illustrating a second conveying carriage for use in a maintenance area of the molding installation.
Figure 3:
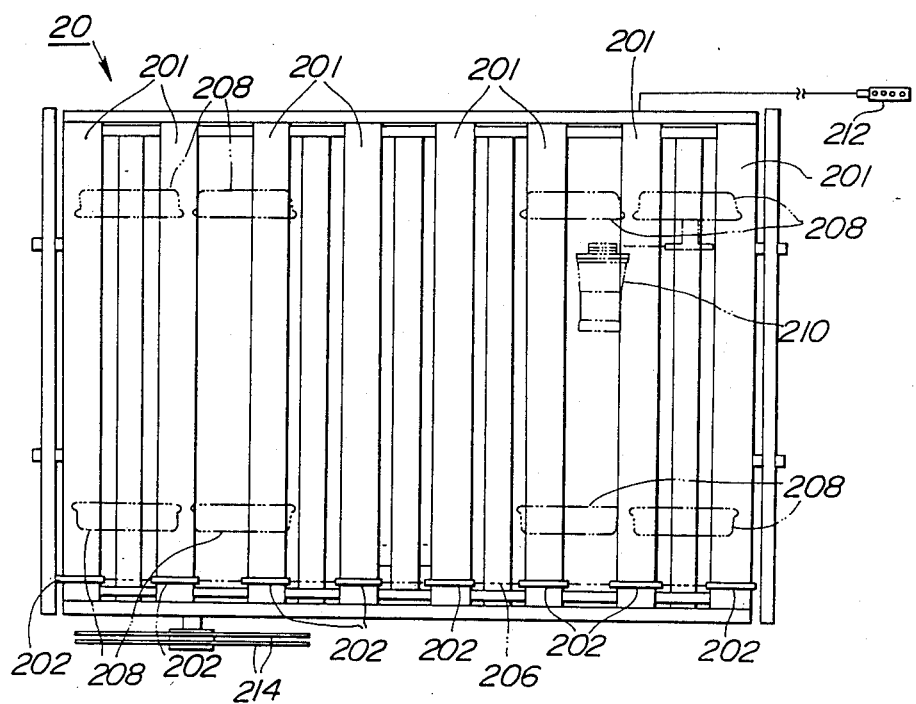
FIG. 3 is a top view illustrating the second conveying carriage of FIG. 1.

Referring to FIGS. 2 and 3, the second conveying carriage 20 is shown to be provided with plural conveyer rollers, referred to generally as 201, on the top thereof. The conveyer rollers 201 are disposed separately from and in parallel to each other in the widthwise direction of the second conveying carriage 20. On the front and rear side ends of the conveyer rollers 201 is disposed each a sprocket 202 connected to a hydraulic motor 204 operatively driven by manual operation of a switch 212 through an endless chain 206, thus permitting a rotational movement of the conveyer rollers 201 in back and forth directions.

The second conveying carriage 20 is operated on a pair of rails 22 built in the maintenance area A and a set of wheels 208 thereof are driven with a hydraulic motor 210 mounted on the second conveying carriage 20. The hydraulic motor 210 is operatively driven by manual operation of the switch 212.

The second conveying carriage 20 is disposed to run back and forth between the die position shifting apparatus 30 and each of crane yards E where the die is hooked over the second conveying carriage 20.

In FIG. 2, reference symbol 214 denotes a reel for a wire.

DIE POSITION SHIFTING APPARATUS (FIGS. 4 AND 5)

Figure 4:
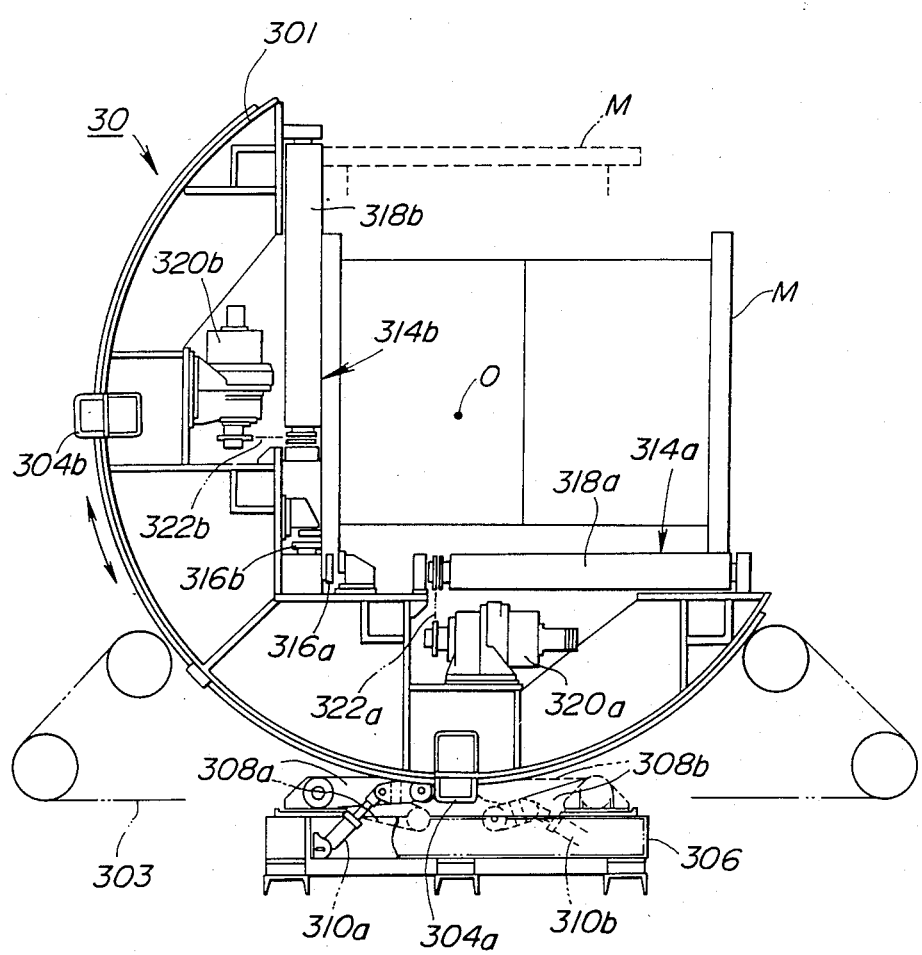
FIG. 4 is a side view illustrating a die position shifting apparatus.
Figure 5:
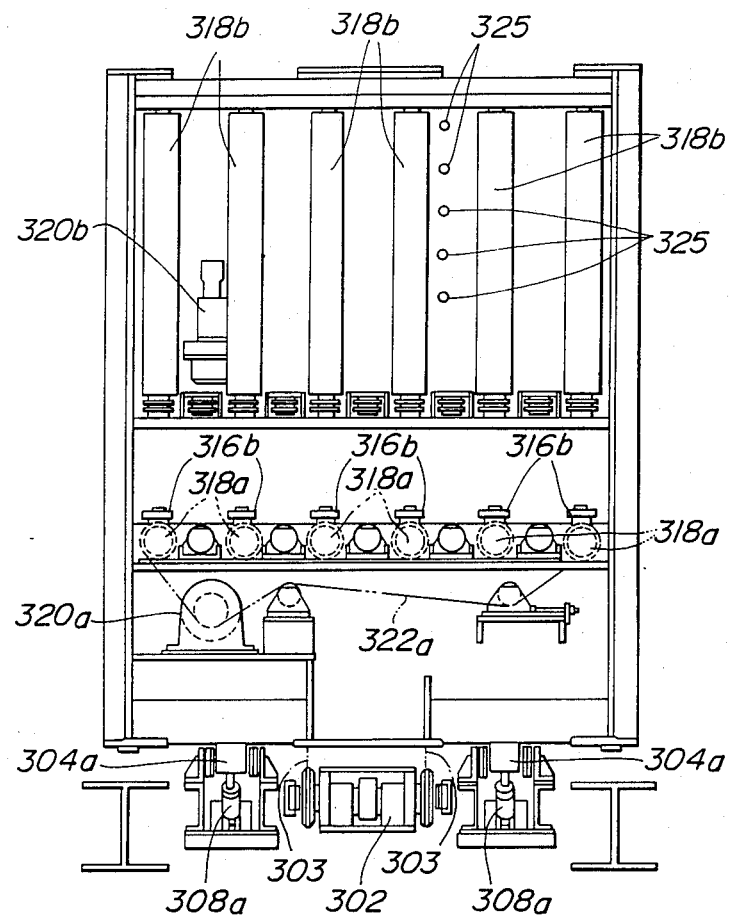
FIG. 5 is a front view illustrating the die position shifting apparatus when seen from the right in FIG. 4.

Referring to FIGS. 4 and 5, the die position shifting apparatus 30 is shown to include a rotary table 301 that has an outer side surface 301a in the shape of an arc and that is driven to rotate about the axis 0 by a hydraulic motor 302 connected through a chain 303 to the rotary table 301.

As shown specifically in FIG. 4, the outer arced side surface 301a of the rotary table 301 is provided at the middle portion thereof with two pairs (FIG. 5) of projections 304a and 304b separately from each other at the angle of 90 degrees. A base 306 mounted under the die position shifting apparatus 30 is provided with a pair of stoppers 308a and 308b that are operatively raised or lowered by cylinders 310a and 310b, respectively, so as to suspend the rotational movement of the rotary table 301 or to release the allow the suspension of the rotary table 301. The die position shifting apparatus 30 is driven to allow the rotary table 301 to rotate at a 90-degree angle in the counterclockwise direction until the projection 304a is brought into engagement with the stoppers 308a and 308b that have been raised by the cylinders 310a and 310b. When the rotary table 301 is reversely turned in the opposite (clockwise) direction, the stoppers 308a and 308b are lowered to disengage therefrom the projections 304a, and the rotary table 301 is then allowed to be turned at the 90-degree angle until its projections 304b is engaged with the stoppers 308a and 308b.

The rotary table 301 of the die position shifting apparatus 30 is further provided on the inner side thereof with two supporting surfaces 314a and 314b for supporting a die thereon. The two supporting surfaces 314a and 314b are arranged so as to be intersected at the angle of 90 degrees. The supporting surface 314a includes plural short conveyer rollers 316a and plural long conveyer rollers 318a, on the one hand, and the supporting surface 314b includes plural short conveyer rollers 316b and plural long conveyer rollers 318b, on the other, as shown specifically in FIG. 5. The long conveyer rollers 318a and 318b are disposed so as to face the axis 0 of the die position shifting apparatus 30 and the short conveyer rollers 316a and 316b are disposed at a corner position formed by the intersection of the two supporting surfaces 314a and 314b. The short conveyer rollers 316a and 316b are rotatively mounted and the long conveyer rollers 318a and 318b are operatively driven by hydraulic motor 320a and 320b, respectively, to be rotated in back and forth directions. The long conveyer rollers 318a and 318b are connected to the hydraulic motor 320a and 320b through endless chains 322a and 322b, respectively.

The die position shifting apparatus 30 is further provided with a die thickness detecting mechanism 325 for detecting the die thickness of a die M, that is, a length of a combination of the front mold M-a and the rear mold M-b constituting the die M in a direction of juxtaposition. In this embodiment, the die thickness detecting mechanism 325 comprises a plurality of proximity switches as shown in FIG. 5. A set of the proximity switches 325 is mounted on the rotary table 301 in such a manner capable of detecting the position of a mounting plate for the front mold M-a far from that for the rear mold M-b. The number of the proximity switches 325 is disposed so as to correspond with the number of types of die thicknesses of dice M to be loaded. The die thickness detecting mechanism 325 enables a detection of a die thickness of the die M by checking which proximity switch 325 is turned on. A switch or sensor of various types such as a phototube type or a contact type may be employed for detection of the die thickness of the die M.

FIRST CONVEYING CARRIAGE (FIGS 6 TO 12)

Referring to FIG. 6, the first conveying carriage 10 is shown to include a frame 102, a pair of tables, referred to generally as 106, each being slidably movable on a pair of rails 104 mounted on the frame 102, a hooker 108 mounted on each of the tables 106, and a clamp mechanism 110 mounted under the frame 102 for clamping the first conveying carriage 10 for fixation of the suspension position thereof. The first conveying carriage 10 is operated with wheels 112 driven by a hydraulic motor 114.

As shown in FIG. 7, the clamp mechanism 110 includes a pair of clamp arms referred to generally as 116. More specifically, the clamp arms 116a and 116b are mounted under the frame 102 in such a manner as capable of being moved pivotally by hydraulic cylinders 120a and 120b about rotational shafts 118a and 118b, respectively. The clamp mechanism 110 is designed so as to clamp a position projection 14 (the clamping position) with the clamp arms 116a and 116b pushed down by the hydraulic cylinders 120a and 120 b, respectively, as shown by the solid lines in FIG. 7. The position projection 14 is mounted on the passage (the rails 12) of the first conveying carriage 10 in each station in order to determine the position of the first conveying carriage 10. When the first conveying carriage 10 starts moving, the clamping is released by pulling up the respective clamp arms 116a and 116b (the releasing position) by the hydraulic cylinders 120a and 120b, as shown by the broken lines in FIG. 7. The clamp mechanism 110 is designed to determine the position of suspension of the first conveying carriage 10 on the basis of the position of the front cavity to be loaded thereon.

Turning back to FIG. 6, the pair of the tables 106 mounted on the frame 102 are shown to be connected to each other through a connecting rod 121 and disposed to move together on the frame 102 by a hydraulic motor (not shown). A stopper 122 is mounted each on the both front and rear end portions of the frame 102. Furthermore, a pair of movable stoppers 124 are mounted at the middle portion thereof in a direction of movement of the tables 106. The movable stoppers 124 are raised or lowered by a hydraulic motor 126 at the clamping position or at the releasing position, respectively. When the movable stoppers 124 are raised, on the one hand, the movement of the table 106 is suspended and, when the movable stoppers 124 are lowered, on the other, the suspension of the movement of the tables 106 is released and the table 106 is then allowed to move again.

Figure 8:
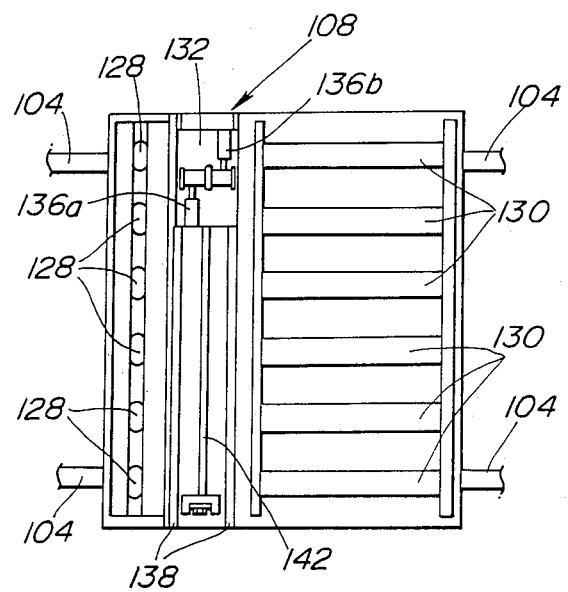
FIG. 8 is a top plane view illustrating the top portion of a table of the first conveying carriage.
Figure 9:
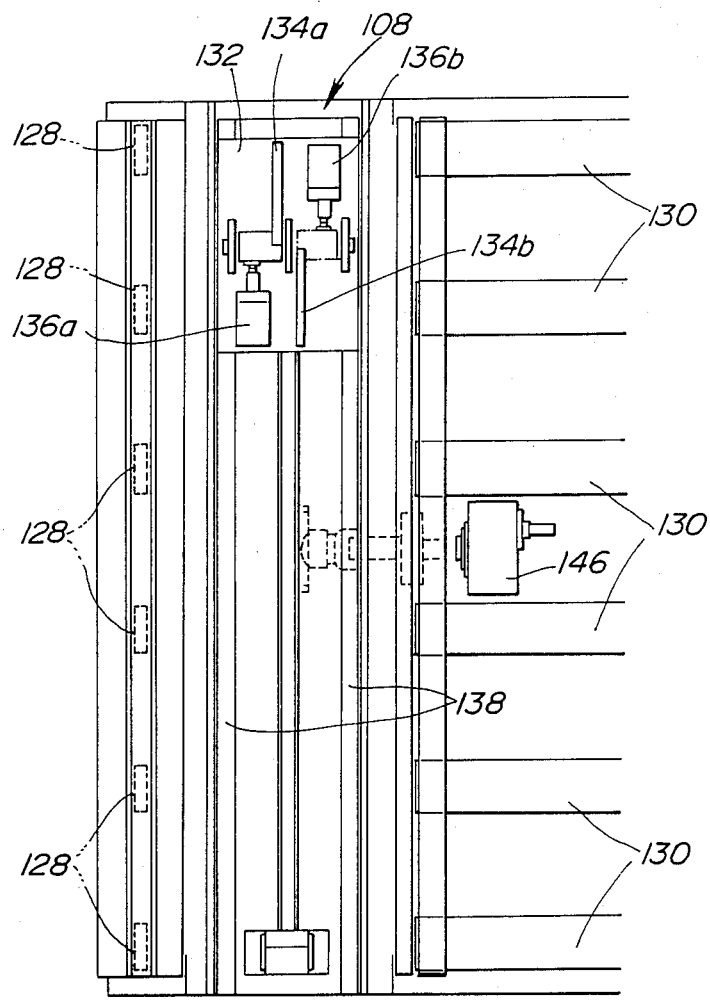
FIG. 9 is an enlarged top plane view illustrating the top portion of the table.

Turning now to FIGS. 8 and 9, the table 106 is provided rotatively with plural short conveyer rollers, referred to generally as 128, on the front end portion thereof (on the front side portion of the die position shifting machine 30) and plural long conveyer rollers, referred to generally as 130, on the rear end portion thereof. Both the short conveyer rollers 128 and the long conveyer rollers 130 are disposed in the widthwise direction of the table 106 and constitute a surface for supporting a die to be loaded on the table 106. The short conveyer rollers 128 receive and support a front mold M-a (not shown) as a fixed part of the die or mold, on the one hand, and the long conveyer rollers 130 receive and support a rear mold M-b (not shown) as a movable part thereof.

DIE TRANSFER MECHANISM MOUNTED ON FIRST CONVEYING CARRIAGE (FIGS. 8 TO 12)

Figure 10:
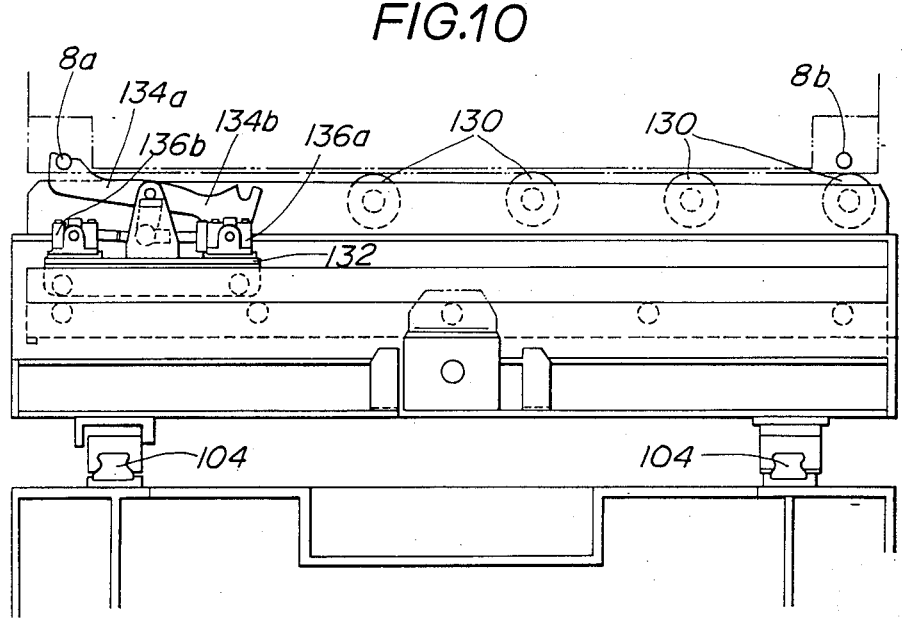
FIG. 10 is a side view illustrating a clamp mechanism with an outline of the table.
Figure 11:
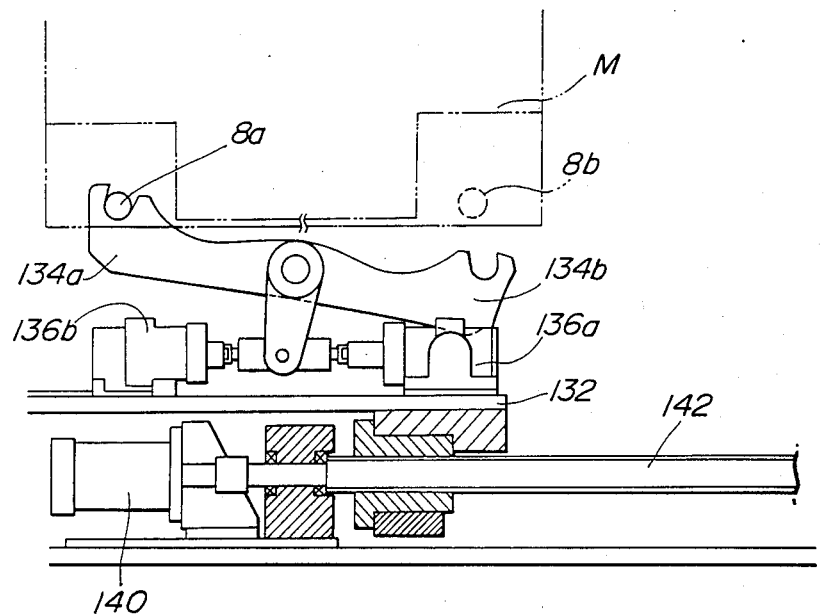
FIG. 11 is a partially sectional side view of the clamp mechanism.

As shown more specifically in FIG. 9, a die transfer mechanism of the first conveying carriage 10 comprises the hooker 108 that is in turn shown to be disposed between the short conveyer rollers 128 and the long conveyer rollers 130 in such a manner as permitting receipt and delivery of a die. As shown in FIGS. 10 and 11, the hooker 108 includes two hooks 134a and 134b arranged on a sliding table 132 each of which is driven by the respective hydraulic cylinders 136a and 136b. The hook 134a is driven by the hydraulic cylinder 136a to engage with an engaging rod 8a mounted on a die M or to disengage from the engaging rod 8a, on the one hand. The hook 134b is likewise driven by the hydraulic cylinder 135b to engage with an engaging rod 8b mounted at the opposite side on the die M and disengage from the engaging rod 8b, on the other hand. The sliding table 132 is slidably transferable by guidance on guide rails 138 with a first hydraulic motor 140 and a screw gear 142 connected thereto.

Figure 12:
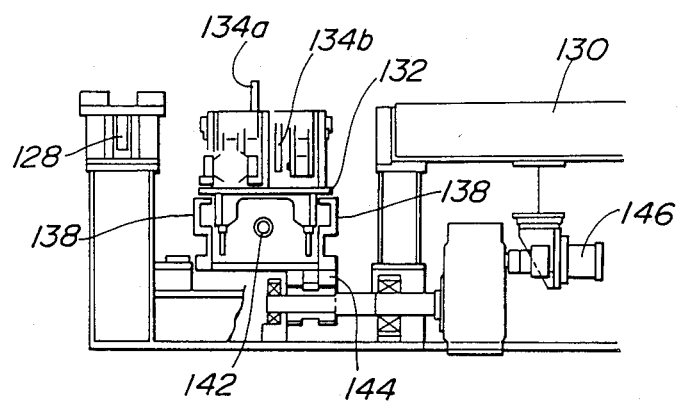
FIG. 12 is a front view of the clamp mechanism.

As shown specifically in FIG. 12, racks 144 are mounted under the guide rails 138 for slidably guiding the sliding table 132 and are movable by a second hydraulic motor 146 in the widthwise direction of the first conveying carriage 10. The racks 144 are designed to move together with the guide rails 138 and the sliding table 132 and extend in a two-state stroke in the widthwise direction of the first conveying carriage 10, as will be described hereinbelow, leading to delivery or receipt of the die M between the first conveying carriage 10 and the preparatory temperature adjusting apparatus 4 and between the first conveying carriage 10 and the stocker 6.

In accordance with the present invention, the die transfer mechanism of the first conveying carriage 10 presents the advantage that a die transfer mechanism need not be mounted on each of the stockers 6 because the die is transferred between the first conveying carriage 10 and the stocker 6 by means of the die transfer mechanism mounted on the first conveying carriage 10.

Figure 13:
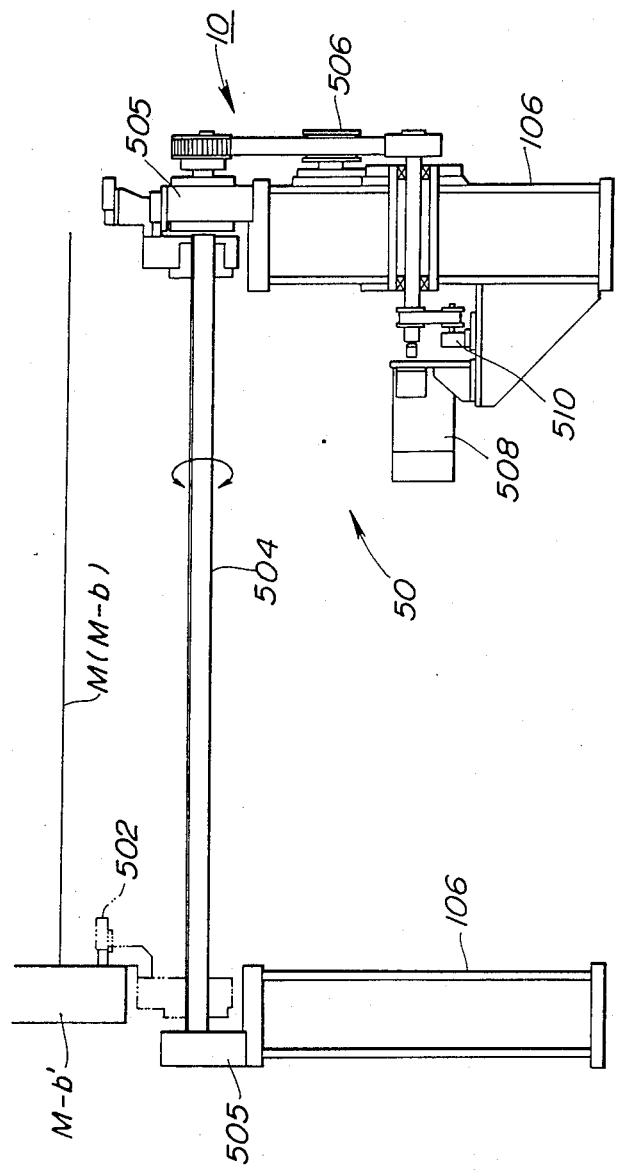
FIG. 13 is a view illustrating a die thickness detecting mechanism mounted on the first conveying carriage.

DIE THICKNESS DETECTING MECHANISM MOUNTED ON TABLE OF THE FIRST CONVEYING CARRIAGE (FIG. 13)

As shown in FIG. 13, the first conveying carriage 10 is further provided with a die thickness detecting mechanism 50 for detecting the die thickness of a die M loaded thereon. The die thickness detecting mechanism 50 is shown to include a contact finger 502 in abutment with a mounting plate M-b for the rear mold M-b far away from that for the front mold M-a (not shown) of the die M loaded over the conveyer rollers 128 (not shown) and 130 (not shown). The die thickness of the die M can be detected on the basis of an amount of displacement of the contact finger 502 from a reference position to be set on the table 106. More specifically, a ball screw 504 is rotatively held slightly below the conveyer rollers 128 and 130 by a pair of bearings 505 in parallel with the direction of movement of the first conveying carriage 10. The contact finger 502 is also connected to the ball screw 504 in such a manner as being displaced in accordance with a rotation of the ball screw 504 in the axial direction thereof.

The ball screw 504 is allowed to rotate in both directions by a motor 508 through a transmitting mechanism 506 including a toothed pulley, a timing belt, a shaft and so on. The rotation of the ball screw 504 is detected by a rotary encoder 510 as an amount of displacement of the contact finger 502.

TRANSVERSE INJECTION MOLDING APPARATUS (FIGS. 1, 14 AND 15)

Figure 14:
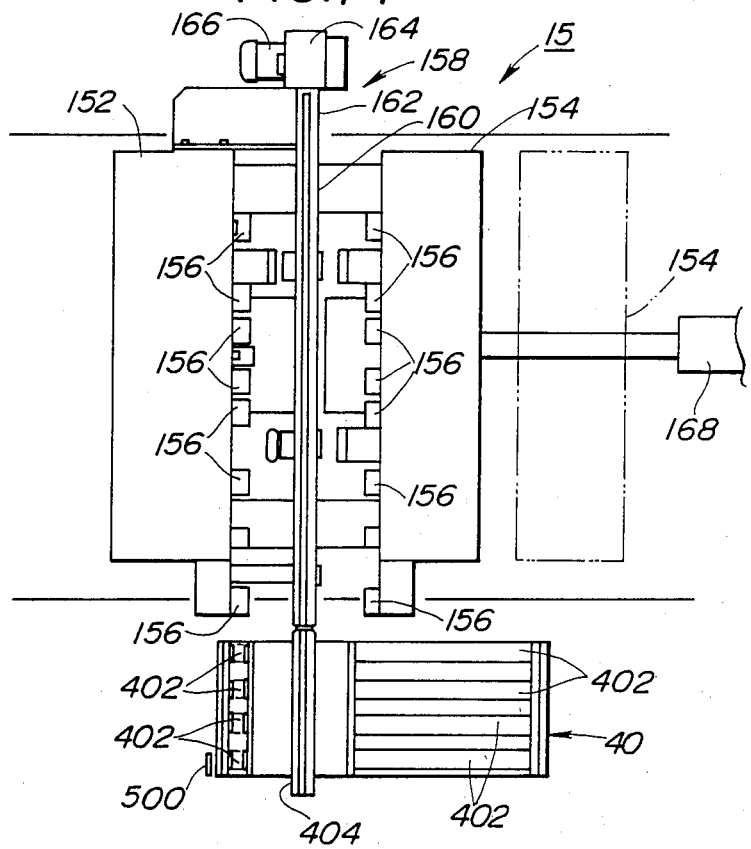
FIG. 14 is a plane view illustrating a hook mounted under a die loading space of a transverse injection molding apparatus with an intermediate table.
Figure 15:
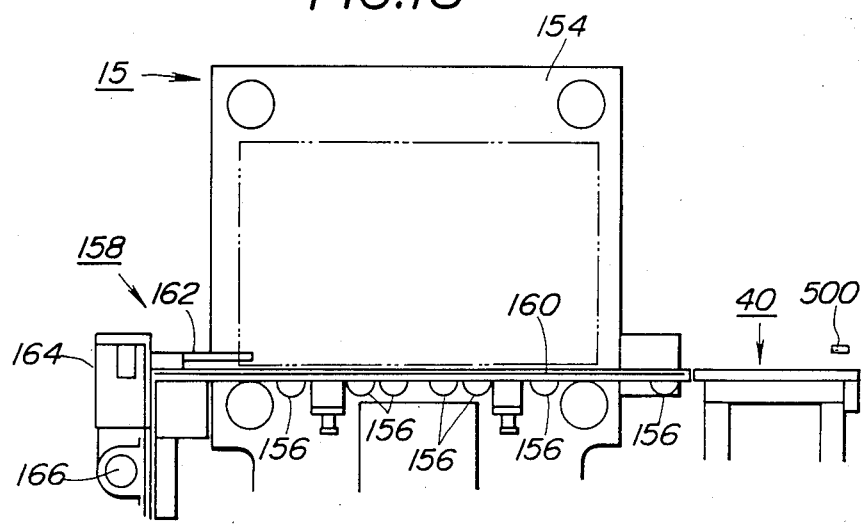
FIG. 15 is a front view of FIG. 15.

Referring to FIGS. 14 and 15, each of the two transverse injection molding apparatuses 15, 15 is shown to include a fixed die plate 152 and a movable die plate 154. In this embodiment, the fixed die plate 152 is located at a position closer to the die position shifting apparatus 30 (to the left side in FIG. 14), on the one hand, and the movable die plate 154 is located at a position opposite to that of the fixed die plate 152 (to the right side in FIG. 14), on the other hand. The die M is loaded in the transverse injection molding apparatus 15 such that the front mold M-a (not shown) is placed on the side of the fixed die plate 152 and the rear mold M-b (not shown) on the side of the movable plate 154.

As shown specifically in FIG. 14, the transverse injection molding apparatus 15 is further provided with two rows of rototable conveyer rollers referred to generally as 156. One row of the conveyer rollers 156a mounted on the side of the fixed die plate 152 is to guide the front mold M-a and the other row of the conveyer rollers 156b on the side of the movable die plate 154 is to guide the rear mold M-b. Between the two rows of the conveyer rollers 156a and 156b is a die conveying pusher 158.

DIE TRANSFER MECHANISM OF MOLDING APPARATUS (FIGS. 14 AND 15)

Turning to FIGS. 14 and 15, the die conveying pusher 158 functioning as a die transfer mechanism of the molding apparatus 15 is shown to include a guide rail 160 extending between and in the direction of the two rows of the conveyer rollers 156, a hook 162 transferable by guidance of the guide rail 160, a belt-like pusher (not shown) connected to and transferring the hook 162, a reel 164 mounted on the one end of the guide rail 160 at the side opposite to the first conveying carriage 10 so as to wind around the belt-like pusher, and a hydraulic motor 166 for driving the rotation of the reel 164.

In a space provided between the transverse injection molding apparatus 15 and the first conveying carriage 10 is disposed an intermediate table 40 that is provided rotatively with plural rotatable conveyer rollers 402 and an extension guide rail 404 extending from the guide rail 160. The hook 162 of the die conveying pusher 158 is disposed to be extendable over the guide rail 160, thus enabling the die conveying pusher 158 to function as delivering or receiving a die M in or from the transverse injection molding apparatus 15 and permitting a smooth delivery or receipt thereof between the transverse injection molding apparatus 15 and the first conveying carriage 10. As the hook 162 extends over the extension guide rail 404 on the intermediate table 40, this construction provides a wider space between the transverse injection molding apparatus 15 and the first coveying carriage 10, thus enabling the space to be used as an area for maintenance of the transverse injection molding apparatus 15.

The provision of the die transfer mechanism on the molding apparatus 15 presents the advantages that the first conveying carriage is rendered of a smaller size and of lighter weight because it can be designed in the relation to the stockers 6 so as to be disposed close thereto. This arrangement can solve problems that arise when the die transfer mechanism mounted on the first conveying carriage 10 is used in two ways for transferring the die M both from or to the stockers 6 and from or to the molding apparatus 15 because, in this case, it should be designed so as to reach a wider range, thus rendering it of a larger size and of heavier weight.

DIE TYPE DETECTING MECHANISM (FIGS. 14 TO 17)

As shown in FIGS. 1, 14 and 15, a detector 500 for detecting the type of a die, which functions as a die type detecting mechanism, is arranged in the midway of a passage of conveyance of the die from the first conveying carriage 10 to the molding apparatus 15 in the neighborhood of the intermediate table 40.

Turning now to FIG. 16, the front mold M-a of the die M is shown to be provided on its outer surface with identification marks, referred to generally as 510, for identifying types of dice. As shown specifically in FIG. 17, the identification marks 510 (nine marks, in this embodiment) are formed each by a circular hollow portion and represent a reference mark D0 and identifiable marks D1 to D8, inclusive. A diameter of the hollow portion for the reference mark D0 (for example, 22 mm in this embodiment) is smaller than a diameter of each of the identifiable marks D1 to D8 (for example, 26 mm in this embodiment). The reference mark D0 and the identifiable marks D1 to D8 are arranged at equal intervals, represented each by a pitch P1 (40 mm in this embodiment), in a direction parallel to the direction of conveyance of the die M to the molding apparatus 15 (in the vertical direction in FIG. 1). Although the eight identifiable marks D1 to D8 are shown in FIGS. 16 and 17, the number of identifiable marks and positions thereof may be increased or decreased in accordance with types of dice. Utilizing the identifiable marks represented by the hollow portions, types of dice such as lengths of dice, injection pressures, and types of molded products, may be translated thereinto as codes.

As shown specifically in FIG. 17, the detector 500 includes a base 501 and plural identification sensors mounted on the base 501 in the number corresponding to the number of the reference mark and the identifiable marks. In this embodiment, the reference sensor S0 and the identifiable sensors S1 to S8, inclusive, are mounted on the base 501 so as to correspond to the reference mark D0 and the identifiable marks D1 to D8, respectively. The identification sensors S0 to S8, inclusive, are arranged in a series in a direction parallel to the direction of conveyance of the die M at the same intervals with the same pitches P1 as the identification marks D0 to D8. As the identification sensors are employed noncontact switches. The identification marks 510 of the die M are thus arranged to pass nearby through the detector 500 at an interval represented by symbol L in FIG. 17 (for example, 3 mm in this embodiment). A sensor area of each identification sensors S0 to S8 is set smaller than each of the diameters of the identification marks D to D8 as indicated by reference symbol "H" for the identification sensor S8 in FIG. 17.

With this arrangement, the detector 500 is designed such that the identification sensors S0 to S8 are turned off, for example, as they face the corresponding identification marks D0 to D8, respectively, and that they are turned on, for example, as they face portions other than the identification marks D0 to D8. In other words, the identification sensors S0 to S8 are of the type operative when they have sensed the portions of the die M other than the hollows portions D0 to D8.

The detector 500 is designed so as to detect the type of a die M in such a manner that the reference sensor S0 is first turned off as it coincides with the reference mark D0 while the die M is being conveyed from the first conveying carriage 10 to the intermediate 40 and the reference sensor S0 is then turned on as the die M is moved slightly from this position in the direction of its conveyance to the molding apparatus 15. In other words, overall positions of all the identifiable sensors S1 to S2 are read once immediately after the reference sensor S0 has turned to the "ON" position from the "OFF" position. As the diameter of each of the identifiable marks D1 to D8 is set larger than that of the reference mark D0, either one of the identifiable sensors S1 to S8 is caused to correspond to and face either one of the identifiable marks D1 to D8 immediately after the reference sensor S0 has been changed from the "OFF" psition to the "ON" position. More sepecifically, a die M is arranged, for example, such that one or more of the identifiable marks, for example, D5 or both D1 and D2, may be omitted, thus capable of a type of the die (for example, a width or an injection pressure of the die or the type of a molded product).

STOCK AREA (FIG. 1)

Referring to FIG. 1, the dice stock area D is shown to be disposed on one side of the passage (rails 12) of the first conveying carriage 10 and provided with a row of the stockers 6 along the rails 12. Each of the stockers is designed so as to accommodate one set of a die M, that is, one pair of a front cavity and a rear cavity. The stocker 6 is provided on its floor surface with conveyer rollers (not shown) the upper surfaces of which form a supporting surface for supporting a die to be placed therein.

The types of the die M accommodated in each of the stockers 6 are memorized in the central control unit U.

TRANSFER OF DIE BETWEEN STOCK AREA AND MOLDING AREA

The die M is transferred from the stock area D to the molding area C, if needed, through the preparatory temperature adjusting apparatus 4, or from the molding area C to the stock area D in response to a signal from the central control unit U to the control unit U-1 for the preparatory temperature adjusting apparatuses 4, 4 and the control unit U-2.

Referring to FIG. 1, the first conveying carriage 10 is operatively moved to one of the stockers 6 where a die M (hereinafter will be referred to as the "fresh die") to be set in one of the transverse injection molding apparatuses 15, 15 and then the fresh die M is transferred from the stocker 6 to the table 106 of the first conveying carriage 10 by means of the hooker 108 mounted on the first conveying carriage 10.

The fresh die M so loaded on the first conveying carriage 10 is then conveyed to one of the preparatory temperature adjusting apparatuses 4, 4 and transferred therefrom to the preparatory temperature adjusting apparatus 4 by means of the hooker 108 for pre-heating.

After the preheating of the fresh die M has been finished, the fresh die M is then loaded again on the first conveying carriage 10 by the hooker 108 and conveyed to the transverse injection molding apparatus 15.

When the first conveying carriage 10 with the fresh die M loaded thereon has reached the transverse injection molding apparatus 15, the hooker 162 mounted on the injection molding apparatus 15·is operated to withdraw a die M (hereinafter referred to as the "old die") from the transverse injection molding apparatus 15 and load it on an empty one of the tables 106 mounted on the first conveying carriage 10. The table 106 is then conveyed on the first conveying carriage 10 so as to cause the other table 106 to transfer the fresh die M loaded thereon to the transverse injection molding apparatus 15. The fresh die M loaded on the table 106 is transferred therefrom to the transverse injection molding apparatus 15 by the hooker 162 mounted on the transverse injection molding apparatus 15 and set therein. This concludes a series of work on the die exchanging operation for exchanging the fresh for the old die.

The old die M loaded on the table 106 is then conveyed by the first conveying carriage 10 to one empty stocker 6 for storage or, when a maintenance is required, to the maintenance area A through the die position shifting apparatus 30.

Figure 18:
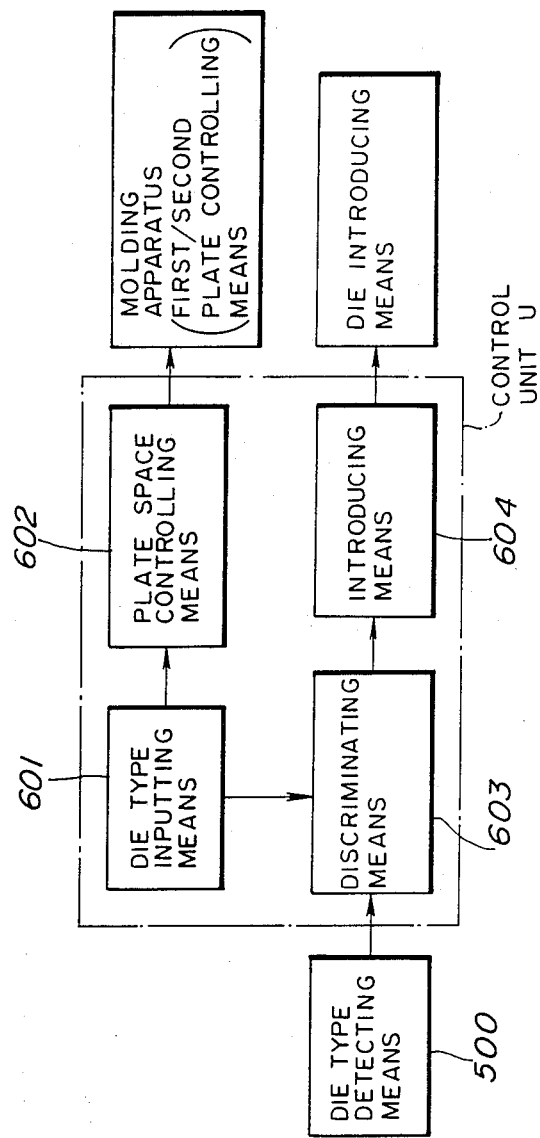
FIG. 18 is a block diagram illustrating a conveyance of a die into the molding apparatus.

Referring to FIG. 18, procedures for loading a fresh die M in the molding apparatus 15 at the time of the die exchanging operation for exchanging the fresh die M for an old die M will be described below. A signal corresponding to a type of the fresh die M to be exchanged for the old die M is first supplied from a die type inputting mechanism 601 to a plate space controlling mechanism 602. The plate space controlling mechanism 602 is to control a space between two plates 152 and 154 by controlling a hydraulic cylinder 168 of the molding apparatus 15 so as to become a value preset in accordance with the type of the fresh die M to be exchanged. This adjustment of the plate space is conducted at an appropriate timing during a period of time until the fresh die M is conveyed into the molding apparatus 15, for example, in the midway of the fresh die M being conveyed by the first conveying carriage 10 toward a position where it is delivered to the molding apparatus 15 or immediately after the first conveying carriage 10 has been suspended at the position where the fresh die M is delievered thereto. The die type inputting mechanism 601 comprises a keyboard and so on, and a signal on the type of the fresh die M may be input whenever the die exchange operation is carried out or signals on types of the fresh dice M to be exchanged may be input in the given order of an input operation of the die type inputting mechanism 601. A signal is then output automatically from the plate space controlling mechanism 602 to the hydraulic motor 166 in this order whenever the fresh die M is exchanged.

As the fresh die M is being transferred from the first conveying carriage 10 through the intermediate table 40 to the molding apparatus 15 by means of the pusher 158 (the hook 162) mounted on the molding apparatus 15, a type of the fresh die M to be loaded in the molding apparatus 15 is detected by the detector 500 as the die type detecting mechanism while the die M is moving.

The detection result obtained by the detector 500 is then compared by a distinguishing mechanism 603 to types of dice previously input by the die type inputting mechanism 601, and a conveyance controlling mechanism 604 controls the hook 162 as a conveyance mechanism to allow the die M to be transferred to the molding apparatus 15, when the result obtained by the distinguishing mechanism 604 corresponds to the type of the fresh die to be exchanged, or to prevent the die M from being conveyed thereto, when the result obtained thereby does not correspond to the type thereof.

This arrangement for a detection of types of the die M to be exchanged in the molding apparatus 15 in the manners as have been described above presents the advantage that the die exchanging operation is rendered efficient from the following points: firstly, a space between the plates 152 and 154 of the molding apparatus 15 where the fresh die M is held can be adjusted during a course of transferal of the fresh die M to the molding apparatus 15 in accordance with the preset value with respect of the type of the fresh die M to be loaded therein; secondly, the type of the fresh die M conveyed can be checked prior to introduction between the plates 152 and 154 of the molding apparatus 15; and, thirdly, a detection of the type of the fresh die M can be done while it is being conveyed for introduction into the molding apparatus 15. Furthermore, this arrangement has the advantage that it can remove a wrong fresh die M prior to introduction thereinto when the die M being conveyed has been detected as a wrong type, then preventing the wrong one from striking against the molding apparatus 15 and from falling.

TRANSFER OF DIE FROM THE FIRST CONVEYING CARRIAGE TO THE DIE POSITION SHIFTING APPARATUS

When the old die M requires maintenance, it is conveyed by the first conveying carriage 10 from the molding area C to the die position shifting apparatus 30 and then to the maintenance area A.

The old die M is transferred from the first conveying carriage 10 to the die position shifting apparatus 30 using the hooker 108 mounted on the first conveying carriage 10 in association with the rotational movement of long conveyer rollers 318 disposed on the die position shifting apparatus 30. The die position shifting apparatus 30 is arranged to preset the die supporting surface 314 prior to receipt of the old die M from the first conveying carriage 10 in accordance with which should be subjected to maintenance, the front mold M-a or the rear mold M-b.

A position of the old die M to be transferred to the die position shifting apparatus 30 from the first conveying carriage 10 is adjusted by varying a position of the table 106 of the first conveying carriage 10 with the old die M loaded thereon with respect to the rails 104 while the position of the frame 102 is set always constant with respect to the rails 12. This arrangement permits an adjustment of the loading of the die M on the die position shifting apparatus 30 in accordance with a die thickness of the old die M.

The die thickness of the die M loaded on the first conveying carriage 10 is detected by the die thickness detecting mechanism 50 in a state of the front mold M-a and the rear mold M-b thereof being juxtaposed or placed together side by side. A signal on the die thickness of the die M is supplied from the die thickness detecting mechanism 50 to the control unit U and the control unit U in turn supplies a signal to control a motor. The motor then drives the table 106 in accordance with the signals output from the central control unit U, thus allowing the right side end of the rear mold M-b in FIGS. 1 and 6 to coincide with and abut with one of the die supporting surfaces 314 of the die position shifting apparatus 30 extending in the vertical direction. The die M is then transferred therefrom to the die position shifting apparatus 30 without any gap between the rear mold M-b thereof in juxtaposition with the front mold M-a thereof and the die supporting surface 314 extending in the vertical direction.

Although there are occasions that the die M may be withdrawn from the injection molding apparatus 15 with its front and rear molds slightly open, it can be loaded in an appropriate posture or position on the die position shifting apparatus 30 by adjusting the relative position of the table 106 with respect to the rails 104 on the first conveying carriage 10.

A SHIFT OF DIE BY THE DIE POSITION SHIFTING APPARATUS

The die M received by the die position shifting apparatus 30 in such a posture or state as the rear mold M-b being juxtaposed with the front mold M-a and abutted with the die supporting surface 314 in the vertical position is then rotated by the die position shifting apparatus 30 on the basis of the rear mold M-b to shift its position so as to meet with requirements for maintenance.

The die position shifting apparatus 30 is operated to rotate its rotary table 301 at the angle of 90 degrees, thereby shifting the position of the die M received from the first conveying carriage 10 to such a standing or erect position as the mold half required for maintenance, whichever the front mold M-a or the rear mold M-b, being brought on the other that is not required for maintenance.

The shift of the position of the die M on the basis of the rear mold M-b in the manner as have been described above can be done without causing a large degree of falling following a big shock, thus leading to a smooth alteration of the position of the die M.

TRANSFER OF DIE FROM THE DIE POSITION SHIFTING APPARATUS TO MAINTENANCE AREA

After the die position of the die M has been shifted by the die position shifting apparatus 30 to that suitable for maintenance, the old die M is then transferred to the second conveying carriage 20 using the long conveyer rollers 318 thereof in association with the rotational movement of the rollers 201 mounted on the second conveying carriage 20 to the crane yard E and subjected to the unloading operation.

After it has been conveyed to a crane yard E, the die M is hooked by a crane (not shown) in the crane yard E unloading it from the second conveying carriage 20 and conveying it with the crane to the maintenance area A for maintenance. The maintenance is conducted with the mold half necessary for maintenance on the top of the other half unnecessary for maintenance.

TRANSFER OF DIE FROM MAINTENANCE AREA TO THE DIE POSITION SHIFTING APPARATUS AFTER MAINTENANCE

After maintenance, the die M is then transferred from the maintenance area A to the die position shifting apparatus 30 using the second conveying carriage 20. The die M is loaded on the second conveying carriage 20 using a crane disposed in the crane yard E and conveyed to the die position shifting apparatus 30. It is then unloaded by means of the rotational movement of the conveyer rollers 201 disposed on the second conveying carriage 20 and loaded on the die position shifting apparatus 30 in association of a rotation of the long conveyer rollers 318 mounted thereon in a such standing state as the mold half that has been subjected to maintenance being on the top of the other half that has not subjected to maintenance. The transfer of the die from the second conveying carriage 20 to the die position shifting apparatus 15 may be done in substantially the same manner as opposite to that used for the transferal from the die position shifting apparatus 15 to the second conveying carriage 20.

Figure 19:
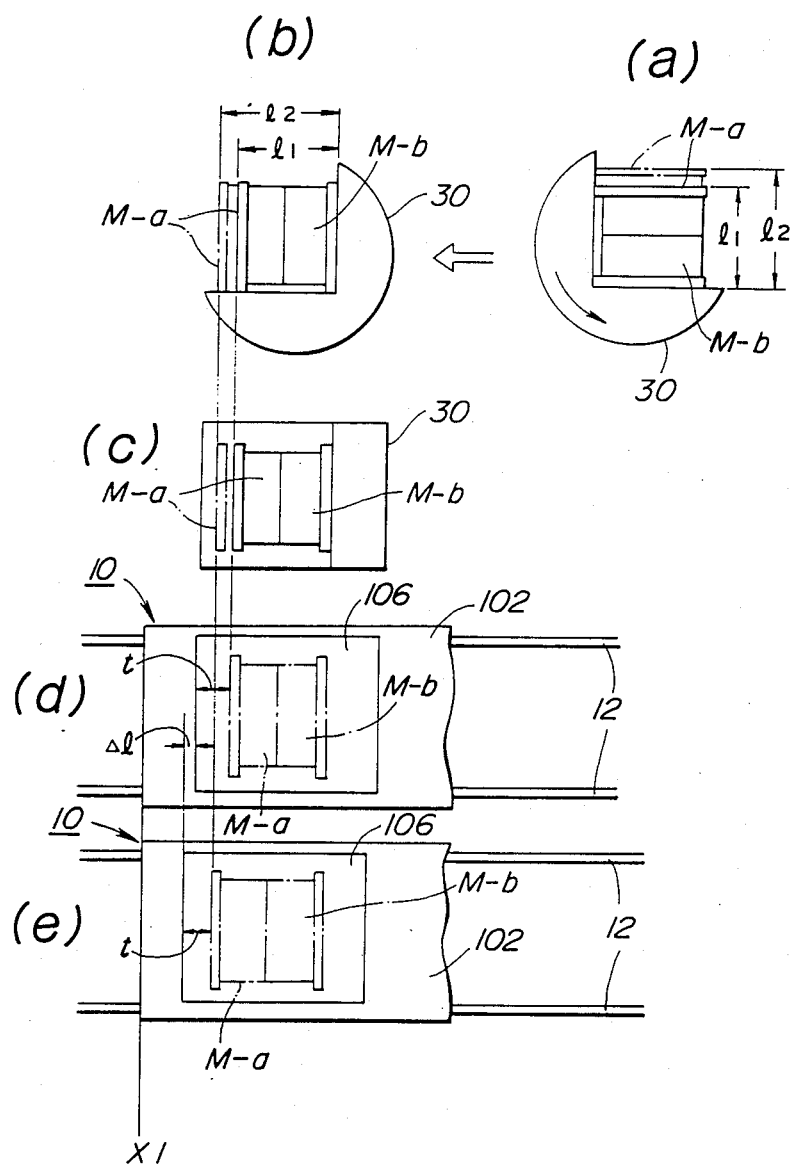
FIG. 19(a) is a side view illustrating the die position shifting apparatus with the die loaded thereon in a standing position.
FIG. 19(b) is a side view of FIG. 17(a), when turned at the angle of 90 degrees to a juxtaposed position.
FIG. 19(c) is a plane view of FIG. 17(b).
FIGS. 19(d) and (e) are each a plane view of a table of the first conveying carriage with a die loaded thereon.

TRANSFER OF DIE FROM THE DIE POSITION SHIFTING APPARATUS TO THE FIRST CONVEYING CARRIAGE (FIG. 19)

The die M is then shifted from its standing position to the juxtaposed positon by the operation of the die position shifting apparatus 15 in substantially the same manner as have been described above. After the die position has been changed, the die M is transferred to the first conveying carriage 10 for conveyance to the preparatory temperature adjusting apparatus 4 and the transverse injection molding apparatus 15.

The die position shifting apparatus 30 is provided with a die position control mechanism for controlling and shifting the position of the die M so as to comply with the position of loading the die M into the temperature adjusting apparatus 4 and the injection molding apparatus 15 in the molding area C. In response to a signal output from the control unit U-2 and so on, the die position shifting apparatus 30 is designed so as to automatically select the die supporting surface 314. This control mechanism serves as controlling the position of the die M delivered from the maintenance area A to the position thereof corresponding to the position in which it is loaded in the molding apparatus 15 and the temperature adjusting apparatus 4.

When the die M is transferred from the die position shifting apparatus 30 to the first conveying carriage 10, it is sometimes necessary to adjust a position of the die for delivery to the first conveying carriage 10. FIG. 19 shows an adjustment of the position of the die position shifting apparatus 30 when the die M is unloaded therefrom to the first conveying carriage 10. In FIG. 19, the figure (a) is a side view of the die position shifting apparatus 30 with a die M loaded in a state of the front mold M-a being on the top of the rear mold M-b; the figure (b) is a side view of the die position shifting apparatus 30 with the die M turned at the angle of 90 degrees from the position of the figure (a) to a state in which the cavity halves consitituting the die M are placed side by side; the figure (c) is a plane view of the die position shifting apparatus 30 of the figure (b); the figure (d) is a plane view of the first conveying carriage 10 at the position of a die M having a smaller die thickness $L_1$ being loaded thereon from the die position shifting apparatus 30; and the figure (e) is a plane view of the first conveying carriage 10 at the time of a die having a larger die thickness $L_2$ being loaded thereon from the die position shifting apparatus 30.

In FIG. 19, the side end position of the frame 102 of the first conveying carriage 10 at the position of the die M being transferred thereto from the die position shifting apparatus 30, represented by reference symbol $X_1$, is set constant regardless of a thicker or thinner die thicknesses of the die M. A substantial position of the die M being loaded on the first conveying carriage 10 is adjusted by an adjustment of the position of the table 106 thereof.

When a die thickness of the die M is as small as $L_1$, the position of the table 106 of the first conveying carriage 10 is located relatively in the right direction shown in FIG. 19, compared to a die thickness of the die M being as large as $L_2$. This allows a distance t from the left side end of the table 106, shown in FIG. 19, to be constant regardless of the die thickness of the die M, thus enabling the die M to be delivered to and loaded on the first conveying carriage 10 at a predetermined position on the basis of the rear mold M-b. It is noted that the difference $\Delta L$ between the die thicknesses $L_1$ and $L_2$ is a difference of the positions of the table 106 at which each of the dice M is loaded thereon. It is a matter of course that the position of the table 106 in accordance with the die thickness of a die M can be adjusted by controlling a driving mechanism of the table 106 by the control unit U in response to a detection of the die thicknesses of the die M by way of the die thickness detecting mechanism (proximity switches) 325.

By adjusting the position of the table 106 at which the die is delivered to and loaded on the first conveying carriage 10, as have been described above, the die M can be transferred from the die position shifting apparatus 30 to the first conveying carriage 10 on the basis of the front cavity regardless of whether the die thickness of a die is thinner or thicker, thus rendering the conveyance of the die to the transverse injection molding machines 15 or the preparatory temperature adjusting apparatus 4 extremely suitable and efficient.

MOLDED PRODUCT CONVEYING LINE L (FIGS. 1 AND 20)

Referring again to FIG. 1, there is shown to be disposed a molded product conveying line L for conveying molded products from the two molding area C and C'. The molded product conveying line L is arranged so as to encircle the second moldingarea C' in an endless manner and, halfway between the two molding areas C and C', to extend along the crane yard E.

Figure 20:
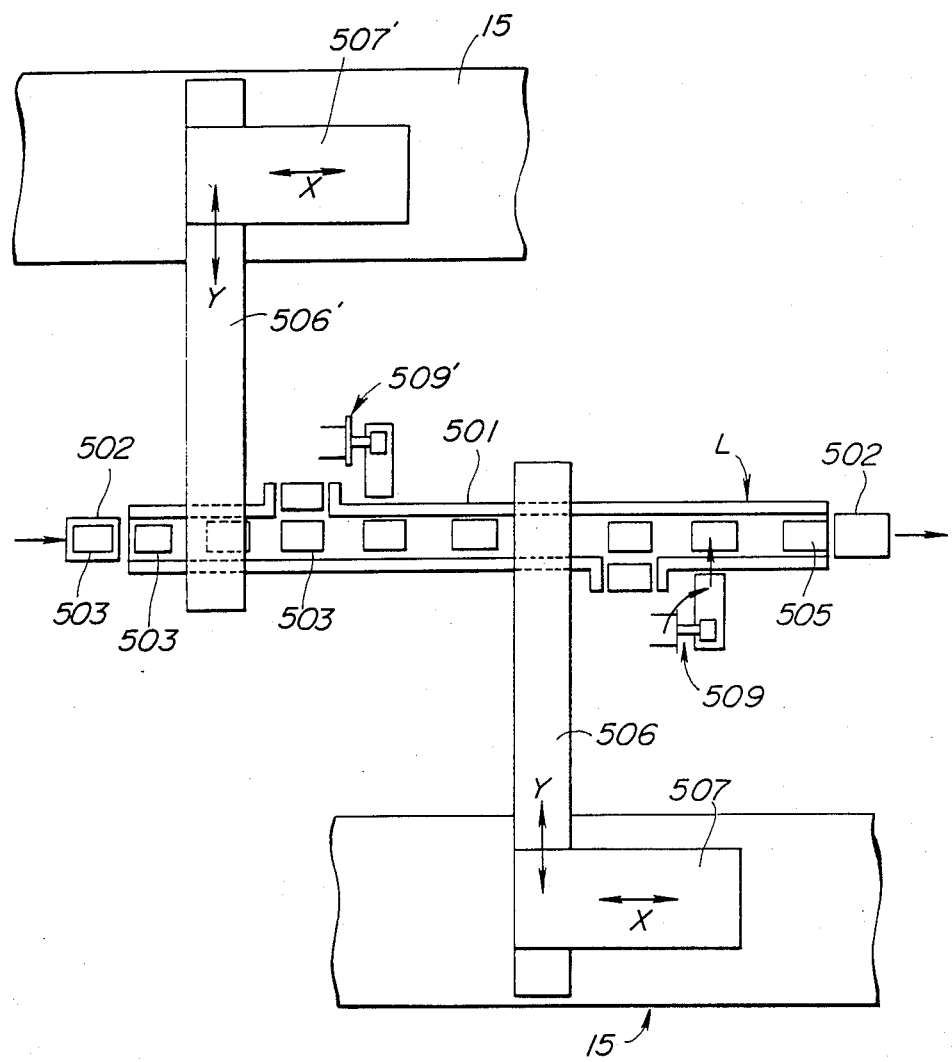
FIG. 20 is a diagrammatical plane view illustrating a layout of a conveyer mechanism for conveying molded products from the molding apparatuses.

Turning now to FIG. 20, the molded product conveying line L for conveying or carrying out the molded products from the two transverse injection apparatuses 15, 15 in the first molding area C and from the two transverse injection apparatuses 15', 15' in the second molding area C'. The conveyer line L is shown to include a pallet conveyer 501 and to be provided with a robot carrier 502. The pallet conveyer 501 is disposed between two rows of the molding apparatuses 15, 15 and 15', 15' (as shown in FIG. 18) and extends in a direction of alignment of the rows of the molding apparatuses 15, 15 and 15', 15' (in the leftward/rightward direction in FIG. 18). The robot carrier 502 is designed to convey an empty pallet 503 from a stock yard 504 to the pallet conveyer 501 and supply it by means of an appropriate mechanism (not shown) such as a lift mechanism or a thrust mechanism to a terminal end of the pallet conveyer 501 from which the empty pallet 503 is loaded thereon. The robot carrier 502 also serves as receiving the pallet 503 with a molded product loaded thereon from the pallet conveyer 501 at the other terminal end thereof and conveying it to the stock yard 504. The robot carrier 502 may be automatically driven to move under the pallet conveyer 501 from the one terminal end of the pallet conveyer 501 after the unloading of the empty pallet 503 to the other terminal end thereof for receipt of the pallet 503 with the molded product thereon.

MOLDED PRODUCT WITHDRAWING LINES N, N (FIGS. 1, 20 TO 22)

As shown in FIGS. 1 and 20, there are disposed in the first molding area C two molded product withdrawing lines N, N for conveying molded products from the transverse injection molding apparatuses 15, 15 to the pallet conveyer 501. Likewise, there are disposed in the second molding area C' two molded product withdrawing lines N', N' for withdrawing molded products from the transverse injection molding apparatuses 15', 15' to the pallet conveyer 501.

As the molded products withdrawing lines N', N' have each the same construction as each of the lines N, N connected to the transverse injection molding apparatuses 15, 15, respectively, a detailed description on one of the molding machines 15, 15 will be made as a representative embodiment with descriptions on the others omitted herefrom for the brevity of explanation.

Figure 21:
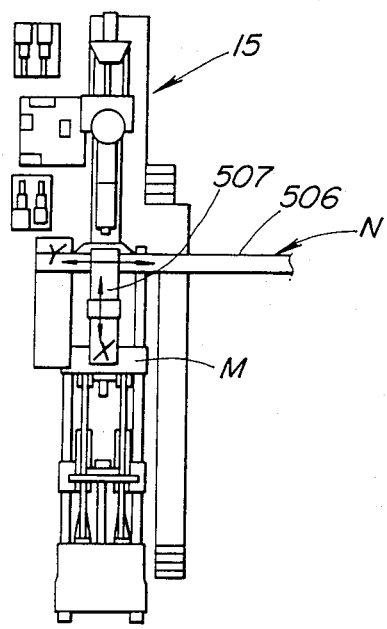
FIGS. 21 and 22 are each a view illustrating the conveyer mechanism of FIG. 20.
Figure 22:
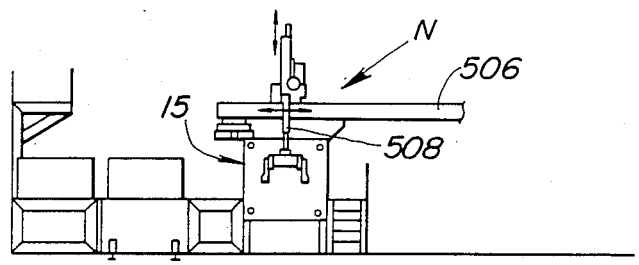

Turning now to FIGS. 21 and 22, the molded product withdrawing line N is shown to include a fixed support member 506, a movable support member 507, an arm member 508, and a loader 509. The fixed support member 506 crosses over the molding apparatus 15 and the pallet conveyer 501 and is fixed at its one end to the molding apparatus 15. The movable support member 507 is fixed at its one end to the fixed support member 506 and is movable in a direction Y in which the fixed support member 506 extends. The movable support member 507 is disposed to extend in a direction in which the die M is opened or closed, i.e., in the vertical direction in FIG. 20. The arm member 508 is supported movably on the movable support member 507 both in a direction X in which the movable support member 507 extends and in the vertical direction.

A molded product is withdrawn from the die M in an open state using the fixed support member 506, the movable support member 507 and the arm member 508. The leader 509 is disposed under an area where the arm member 508 is movable and adjacent to the pallet conveyer 501. The loader 509 functions as receiving the molded product from the arm member 508 and is then rotated so as to allow the molded product to take a position appropriate for delivery to the pallet conveyer 501, then loading it on the empty pallet 503 on the pallet conveyer 501. The molded product formed in each of the transverse injection molding apparatuses 15, 15 is withdrawn therefrom to the molded product withdrawing line N and supplied to the molded product conveying line L that in turn conveys and transfers the molded product to the stock yard 504.

VARIANTS OF EMBODIMENTS

Variants of the preferred embodiments according to the present invention will be described below. In the description of the following embodiments, the same reference symbols and numbers stand for the same elements as have been described above for the first embodiment, and descriptions thereon in duplicate will be omitted here for the brevity of explanation and only the characteristic portions of the variant embodiments will be described below.

SECOND EMBODIMENT (FIGS 23 TO 25)

In the second embodiment, the first conveying carriage 10 is furher provided with a second die type detecting mechanism 500' that is designed to detect the type of a die M in association with the detector 500 mounted on each of the molding apparatuses 15, 15.

Figure 23:
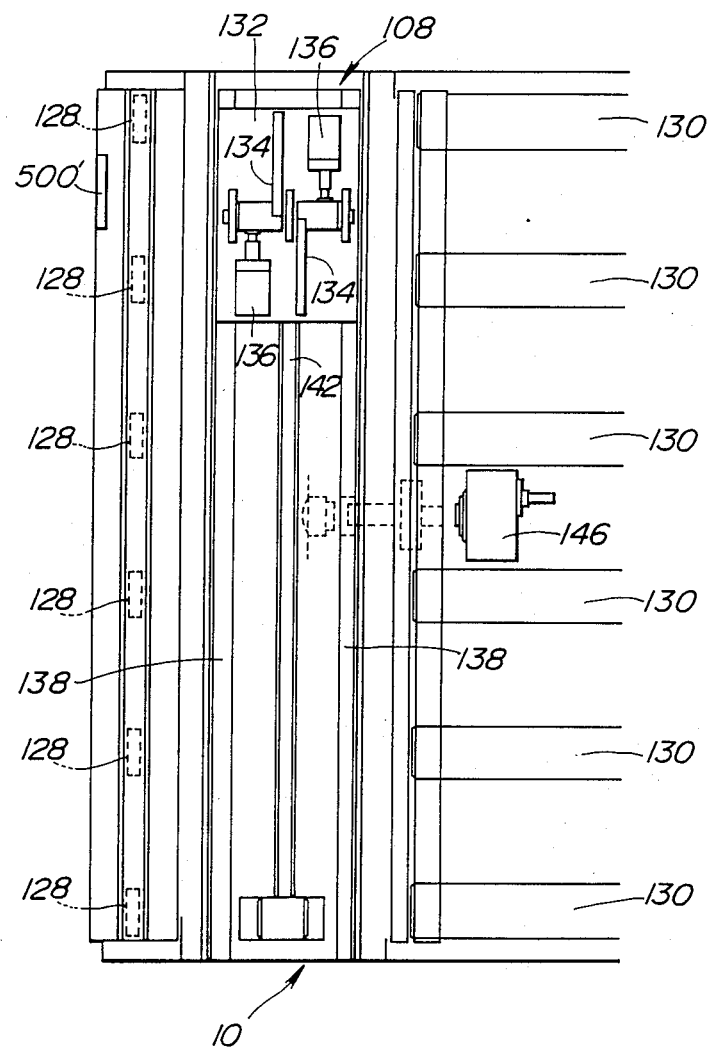
Figure 24:
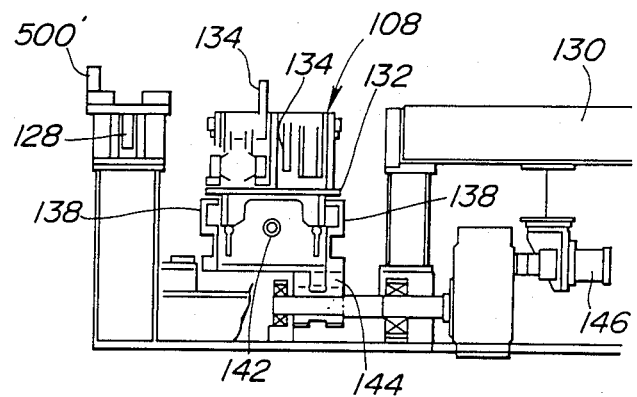

As shown in FIG. 23, the second die type detecting mechanism 500' is mounted on the table 106 on which a fresh die M is loaded for the exchange for an old die in such a manner that it faces a series of identification marks 510 provided on the fresh die M in substantially the same manner as the identification mark 510 shown in FIG. 17. The second die type detecting mechanism 500' is provided with discrimination sensors in substantially the same manner as the first die type detecting mechanism 500 shown in FIG. 17. In this embodiment, the discrimination sensors include a reference sensor S0' and discriminable sensors S1' to S8', inclusive, on the one hand, and the identification marks 510' includes a reference mark D0 and identifiable marks D1' to D8', inclusive, on the other hand, each of which is constituted by a hollow portion in the same manner as the identification marks D0 to D8 above. The second die type detecting mechanism 500' is arranged so at to allow each of the discrimination sensors S0' to S8' to correspond to and face the identification marks D0' to D8'. For the second die type detecting mechanism 500', the reference sensor S0' is designed to be turned off as it has corresponded to the reference mark D0' and, at this moment, which of the identifiable sensors S1' to S8' is actuated is read, thus enabling type of the fresh die M to be detected even if the fresh die M is loaded in a stationary state on the table 106 of the first conveying carriage 10.

When a fresh die M is exchanged for an old die in the molding apparatus 15, the first conveying carriage 10 is first transferred to the stocker 6 where the fresh die M has been stored and the fresh die M is withdrawn from the stocker 6 and transferred therefrom to the table 106 of the first conveying carriage 10 by means of the hooker 108 mounted on the first conveying carriage.

Figure 25:
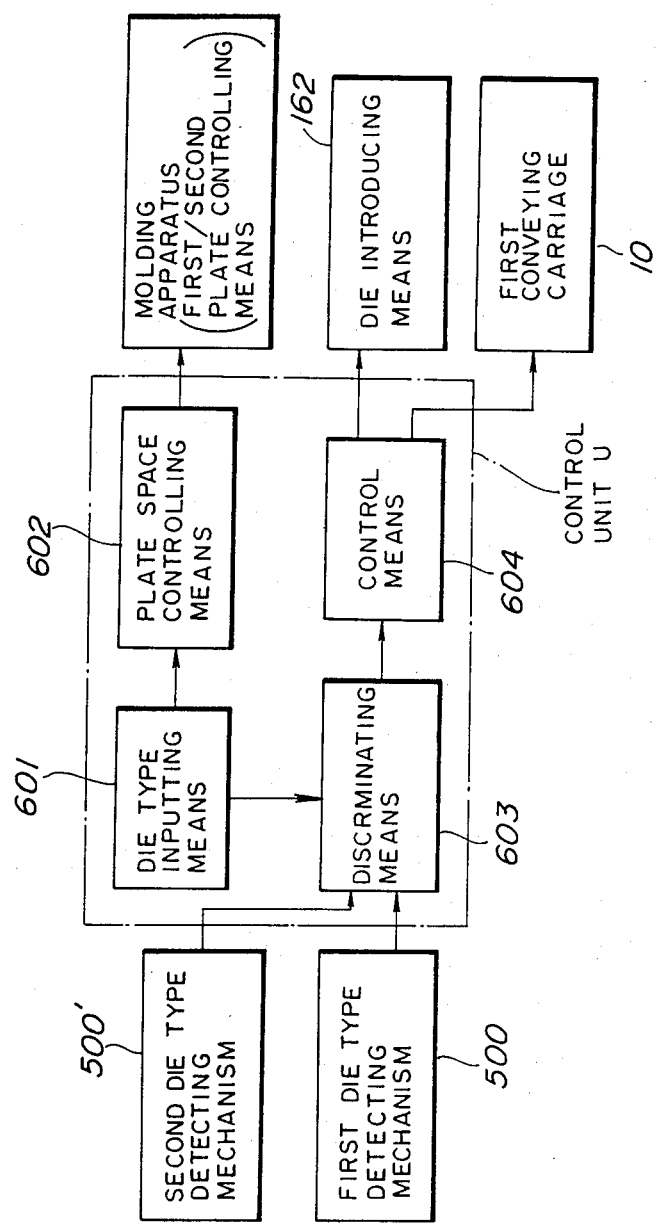

As the fresh die M has been transferred from the stocker 6 to the table 106, the second die type detecting mechanism 510' is disposed so as to face the identification marks 510' formed on the fresh die M, thus leading to a detection of a type of the fresh die M'. As shown in FIG. 25, such detection results are compared in discriminating means 603 to those previously input by die type inputting means 601, and control means 604 controls so as to proceed the fresh die M to the preparatory temperature adjusting apparatus 4 when the die type of the fresh die M has been found to be identical to those input as a result of discrimation by the discriminating means 603, on the one hand, and to suspend the driving of the hydraulic motor 114 of the first conveying carriage 10 when the die type of the fresh die M has been found not to be identical thereto, on the other hand. As an alternative manner when the die type of the fresh die M has been found different therefrom, the hook 162 may be designed not to be operated at the time of conveyance to the molding apparatus 15.

After the pre-heating of the fresh die M has been finished, it is then transferred from the preparatory temperature adjustment apparatus 4 to the first conveying carriage 10 and further conveyed to one of the molding apparatuses 15, 15.

When the first conveying carriage 10 has reached the molding apparatus 15, a die M (old die) in the molding apparatus 15 is transferred therefrom to an empty table 106 of the first conveying carriage 10 and the table 106 is then moved thereon to allow the fresh die M to be introduced into the molding apparatus 15. The fresh die M is then allowed to move toward the molding apparatus 15 through the intermediate table 40. During this movement, the first and second die type detecting mechanisms 500 and 500' are operated to detect a type of the fresh die M being conveyed to the molding apparatus 15.

The detection results from the first and second die type detecting mechanisms 500 and 500' are supplied to the discriminating means 503 where they are compared to types of dice previously input by the die type inputting means 601. A signal is then supplied therefrom to the control means 604 and the control means 604 controls an operation of the hook 162 so as to introduce the fresh die M into the molding apparatus 15 when the fresh die M has been found identical to the type of a die required, thus leading to completion of the die exchanging operation. If the fresh die M that has been conveyed would not be found identical thereto, the control means 604 suspends conveyance of the fresh die M on the molding apparatus 15.

In this embodiment, the two die type detecting mechanisms 500, 500' are employed, thus improving an accuracy of detection of the type of a die M so that an accuracy is improved in terms of prevention of a wrong die against introduction into the molding apparatuses. As a consequence, damages of dice arising a collision with the molding apparatuses can be prevented.

THIRD EMBODIMENT (FIGS. 26 TO 28)

In the first and second embodiments, the molding apparatuses 15, 15 and the preparatory temperature adjusting apparatuses 4, 4 stand ready for loading a fresh die therein in a state of their fixed and movable plates forming a space therebetween adapted so as to hold its front and rear molds in conformity with its die thickness of the die M to be set therein. It is to be noted that a gap may occur between the front and rear molds of the die during conveyance even if the die itself would be found adaptable to the molding apparatus 15 and the preparatory temperature adjusting apparatus 4. Such a gap could be unpredicatable, and neither the molding apparatuses 15, 15 nor the preparatory temperature adjusting apparatuses 4, 4 in such a state as standing ready for loading a die, that is, a space between the fixed and movable plates thereof, can be rendered always suitable and acceptable for the loading. It is accordingly necessary to check whether such a space agrees with the die thickness of the die to be loaded therein prior to conveyance to them. If the space would be found inappropriate, it should be corrected prior thereto.

In this embodiment, a description is directed to an improvement in the preparatory temperature adjusting apparatus 4; however, it should be to be understood that such an improvement is readily applicable to the molding apparatus 15 so that the following should be interpreted as being directed to the molding apparatus 15 as well as to the preparatory temperature adjusting apparatus 4.

Figure 26:
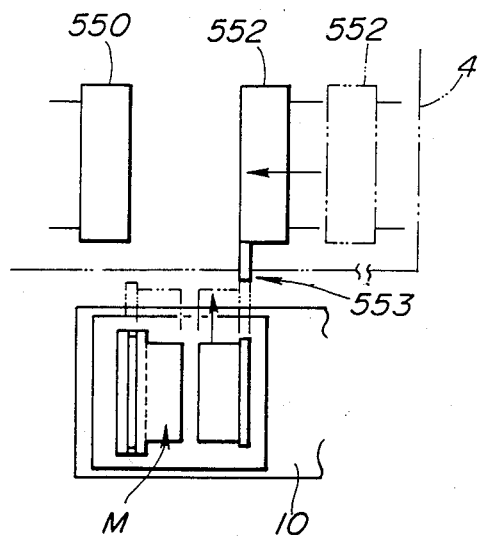

Referring now to FIG. 26, the preparatory temperature adjusting apparatus 4 is shown to be provided with a fixed plate 550 and a movable plate 552. The fixed plate 550 and the movable plate 552 are disposed along the rails 12 with the fixed plate 550 arranged on the side close to the die position shifting apparatus 30 and the movable plate 552 arranged on the side of the molding apparatus 15 in such a manner as being moved closer to or far away from the fixed plate 550. A space between the fixed plate 550 and the movable plate 552 is set slightly larger than a die thickness of the die M (in the horizontal direction in FIG. 26) prior to conveyance thereof to the temperature adjusting apparatus 4, on the one hand, and the movable plate 552 is caused to get closer to the fixed plate 550 to tightly hold the die thickness thereof after the die M has been loaded in the temperature adjusting apparatus 4, on the other hand.

Figure 27:
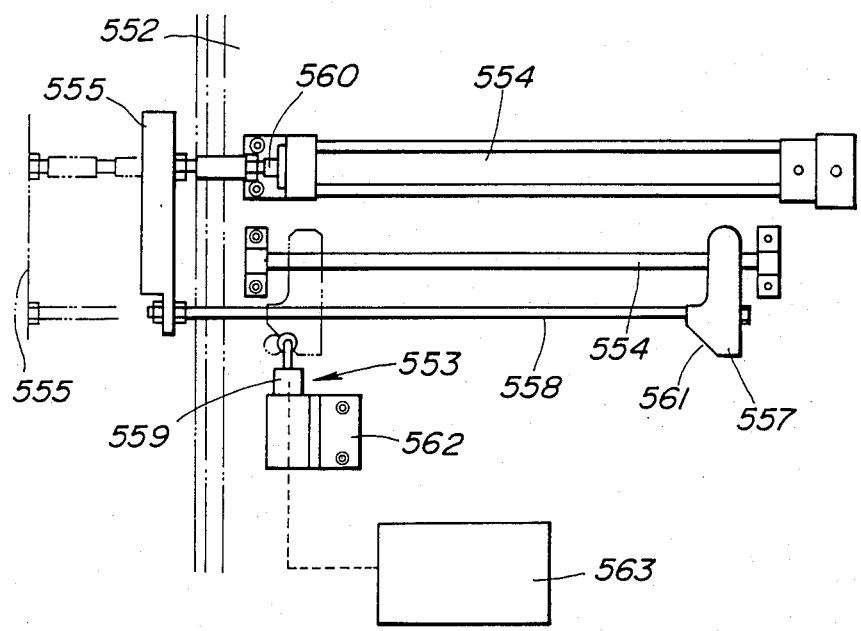
Figure 28:
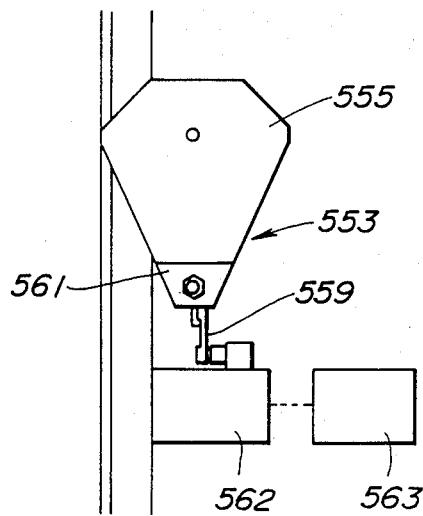

As shown in FIG. 27, the movable plate 552 is provided on its exterior side wall with a detector mechanism 553 as a detecting means. The detector mechanism 553 is shown to include an air cylinder 554, a abutting plate 555, a guide rod 556, a sliding plate 557, a driving force transmitting rod 558, and a limit switch 559. The air cylinder 554 is mounted to an exterior side wall of the movable 552 with a direction of a piston rod 560 being extended toward the rails 12, and a height to which the air cylinder 554 is mounted thereto is lower than the upper portion of the die M loaded on the first conveying carriage 10. The piston rod 560 of the air cylinder 554 is arranged so as to cross the rails 12 when it is extended, and a force of extension at that time is so relatively small that the die M may not be damaged. the abutting plate 555 is mounted on the tip portion of the piston rod 560 of the air cylinder 554 with the abutting surface facing the rails 12 (in the leftward direction in FIG. 26). The guide rod 556 is mounted on the exterior side wall of the movable plate 552 underneath the the air cylinder 554 and disposed in parallel to the air cylinder 554. The sliding plate 557 is held slidably with the guide rod 556. The surface of the sliding plate 557 on the side of the rails 12 forms a cam surface 561 and the cam surface 561 is tapered so as to allow the upper portion thereof to face the rails 12. The driving force transmitting rod 558 is arranged in parallel to and underneath the guide rod 556 with one end portion thereof fixed to the sliding plate 557 and the other end portion thereof fixed to the abutting plate 555.

This arrangement permits a displacement of the driving force transmitting plate 557 and the sliding plate 557 in the direction of the driving force transmitting plate 557 being extented upon extension or contraction of the piston rod 560. The limit switch 559 is mounted on the exterior side wall of the movable plate 552 through a table 562 with the switch mounted in such a manner that it is located at a position at which it is turned on upon abutment with the cam surface 561 at the time when the piston rod 560 is extended to the fullest length in a region where the cam surface 561 of the sliding plate 557 displaces. The limit switch 559 is held in an "off" state when the piston rod 560 is not extended to the fullest length.

A signal detected by the limit switch 559 is input into a control circuit 563. As the limit switch 559 is turned on, the control circuit 563 allows the hooker 108 as a conveyance mechanism to be operted to convey the die M and, when the limit switch 559 is turned off, the hooker 108 is brought into a state of being suspended, thus suspending the conveyance of the die M.

This arrangement is allowed to extend the piston red 560 of the air cylinder 555 at the time when the die M in a normal state is conveyed from the first conveying carriage 10 to the temperature adjusting apparatus 4. At this time, the piston rod 560 is allowed to extend to the fullest length and then returned to the original position because the die M is not allowed to be situated in the region where the abutting plate 555 can move. As the piston rod 506 extends, the sliding plate 557 is also allowed to move slidably on the guide rod 556, thus enabling the cam surface 561 of the sliding plate 557 to actuate the limit switch 559 into an "on" state. As the limit switch 559 is turned on, the control circuit finds a die thickness of the die M normal and acceptable and then operates the hooker 108 to start introducing the die M into the temperature adjusting apparatus 4.

In the event that a gap is caused to arise between the front and rear molds of the die M in accidents during conveyance and consequently that a die thickness of the die M becomes wider than a predetermined space between the fixed plate 550 and the movable plate 552 of the temperature adjusting apparatus 4, the die M blocks an extension of the abutting plate 555 in the midway, and the sliding plate 557 is caused not to extend until the cam surface 561 thereof does not reach the limit switch 559 and turn it on. This construction allows the control circuit 563 to recognize deviations in a die thickness of the die M, thus leading to a suspension of movement of the hooker 108 and, as a consequence, suspending conveyance of the die M into the temperature adjussting apparatus 4. With this arrangement in accordance with this embodiment, the suitability of a die M is automatically judged and the hooker 108 as the conveyance mechanism is consequently operated, thus leading to a rapid treatment of the die conveyance step.

In this embodiment, as have been described above, the die thickness of a die M is detected by displacement of the abutting plate 555 from the side of the temperature adjusting apparatus 4 to the side of the rails 12. This construction enables a quick detection of a die thickness of the die M during conveyance in the event that a space between the rails 12 and the fixed plate 550 as well as the movable plate 552 is smaller. It is also noted that the detection mechanism 553 is constructed mechanically so that it is more advantageous than an employment of photosensors in working situation rich in dusts or the like.

As variants in this embodiment, detection means such as a limit switch for detecting the die thickness of a die M may be arranged in the midway of a passage of conveyance into the preparatory temperature adjusting apparatus 4. A combination of this detection means with the detection mechanism 553 may improve an accuracy of detection of deviations in a die thickness of the die M to a higher degree. A photosensor may be employed as the detection means in a circumstance where it is not abundant with dusts.

It is further noted that substantially the same arrangement can be applied to the molding apparatus 15.

FOURTH EMBODIMENT (FIGS 29 TO 31)

Figure 29:
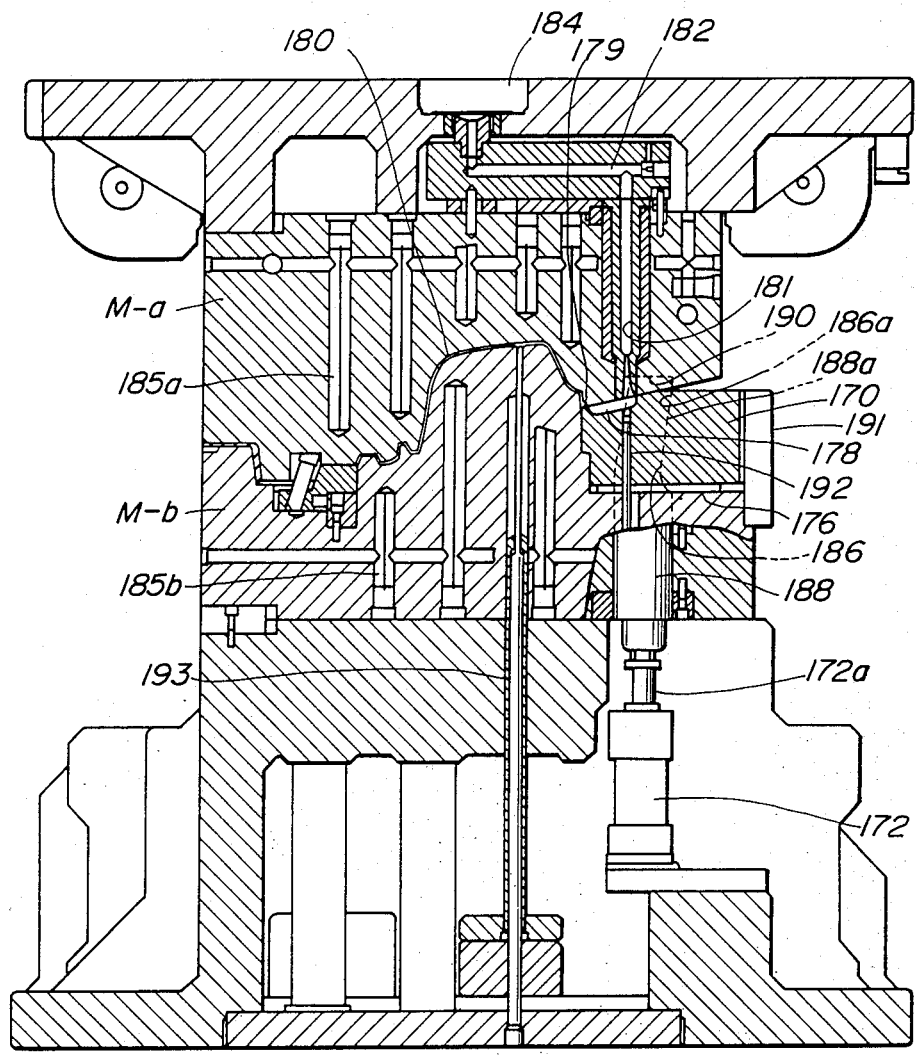
Figure 30:
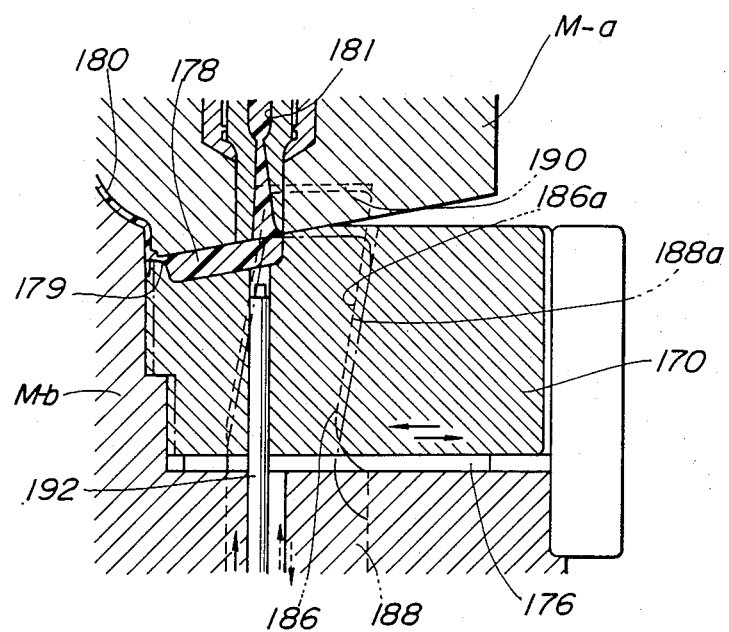
Figure 31:
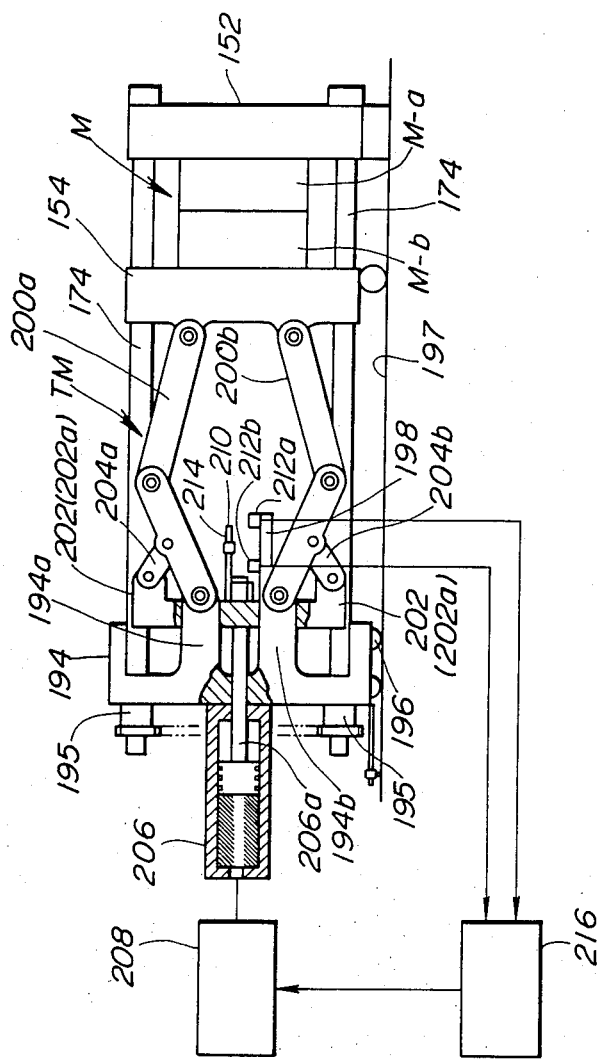

The injection molding apparatus 15 requires adjustment of a clamping force for cutting a gate after molding. The gate cutting may be effected by a displacement of a slide core 170 between the front mold M-a and the rear mold M-b as shown in FIGS. 29 to 31, so that it is necessary to reduce the clamping force to such a degree that a displacement of the slide core 170 is not disturbed. On the contrary, it is a matter of course that, even at the time of the gate cutting, the front mold M-a and the rear mold M-b must be so securely fastened that the clamping force should be adjusted at the time of the gate cutting so as to be neither stronger nor weaker.

In conventional manner, the clamping force is controlled at the time of the gate cutting by detecting an amount of a tie bar 174 restorning from an amount of extension at the time of the clamping. However, from the practical point of view, a length of the tie bar 174 is as long as approximately 8 meters in the axial direction while an amount of its extension is as much as several millimeters to the largest extent; accordingly, the conventional technique involving a detection of a restoring amount of the tie bar 174 from the extended amount is not sufficient in accuracy.

Referring to FIG. 31, the movable mold M-b is driven by means of a toggle mechanism TM. In this embodiment, the clamping force is adjusted at the time of the gate cutting by means of an amount of displacement of the toggle mechanism TM. This is based on the fact that the amount of displacement of the toggle mechanism TM is greater.

Turning now to FIGS. 29 and 30, the slide core 170 is arranged through a spacer 176 between the front mold M-a and the rear mold M-b. Between the slide core 170 and the front mold M-a is formed a runner 178 and a gate 179. The gate 179 is communicated with a cavity 180 and the runner 178 is communicated through an extension nozzle 181 and a hot runner 182 to a resin injection hole 184 that is in turn provided therein with an injection nozzle (not shown) of the injection molding apparatus 15. An amount of a resin injected from the injection nozzle is injected into the cavity 180 from the gate 179 through the hot runner 182, the extension nozzle 181 and the runner 178. The front mold M-a and the rear mold M-b are provided with coolant passages 185a and 185b, respectively, around the cavity 180 to cool down the front and rear molds, thus allowing cooling water to accelerate solidification of the resin filled in the cavity 180.

As shown specifically in FIG. 30, the slide core 170 is provided with a through hole 186 with an inclined surface 186a inclining toward the outside, and the upper half portion of a slide cam 188 with an inclined surface 188a corresponding to the inclined surface 186a is slidably inserted into and held detachably with the through hole 186 of the slide core 170. The bottom of the slide cam 188 is fixed to the tip portion of a piston rod 172a of a fluid cylinder 172 as the toggle mechanism TM supported on a base 189. As the fluid cylinder 172 is operated to extend its piston rod 172a, the slide cam 188 is allowed to insert into the slide core 170 in such a manner as the inclined surface 188a of the slide cam 188 being slided on the inclined surface 186a of the through hole 186 of the slide core 170 from a state as described by the imaginary lines to a state as described by the solid lines in FIG. 30. The slide core 170 in this state communicates with the cavity 180 and the nozzle of the injection molding apparatus 15. The tip portion of the slide cam 188 is caused to engage in this state with an engaging groove 190 formed on the front mold M-a thus preventing the slide core 170 from being disengaged.

The slide cam 188 is moved downwardly by a contraction action of the fluid cylinder 172, the inclined surface 188a is slided in the direction opposite to the inclined surface 186a of the through hole 186 of the slide core 170, whereby the slide core 170 is moved backwardly from the state as described by the solid lines to a state as described by the imaginary lines in FIG. 30. The top portion of the slide cam 188 is disengaged in this state from the engaging groove 190 of the front mold M-a thus enabling a backward movement of the slide core 170 and thereby cutting the gate 179 and the cavity 180. At this time of the gate cutting, the clamping force applied to the front mold M-a and the rear mold M-b is controlled so as to be rendered so small to enable the backward movement of the slide core 170. The backward movement of the slide core 170 is controlled by a stopper 191. In FIGS. 29 and 30, reference numbers 192 and 193 denote ejector pins, respectively.

Turning now to FIG. 31, one end portion (the right end portion in FIG. 31) of the tie bar 174 is fixed each to four corners of the fixed die plate 152, and the other end portion thereof (the left end portion in FIG. 31) extends in the horizontal direction and passes through each of four corners of a housing 194. The outer circumference of the other end portion of the tie bar 174 is threaded to form a male screw and secured with a nut 195 at the rear side (the right side surface in FIG. 31) of the housing 194, thus controlling a leftward movement of the housing 194.

The housing 194 is arranged slidably with respect to each of the tie bars 174 and provided at its bottom portion with wheels 196 running on a base surface 197. The housing 194 has an upper guide portion 194a and a lower guide portion 194b, each projecting horizontally toward the fixed die plate 152. The lower guide portion 194b is further provided at its tip portion with a switch mounting portion 198 directed horizontally toward the fixed die plate 152.

As shown in FIG. 31, the movable die plate 154 is arranged between the fixed die plate 152 and the housing 194. The tie bar 174 is disposed to pass through each of the four corners of the movable die plate 154 that is in turn held slidably by each of the tie bars 174. At the bottom portion are mounted wheels 196a running on the base surface 197. The die M is arranged to be clamed between and by the fixed die plate 152 and the movable die plate 154.

The toggle mechanism TM is mounted between the movable die plate 174 and the housing 194 and shown to include a pair of an upper toggle joint 200a and a lower toggle joint 200b and a cross head 202. The upper toggle joint 200a and the lower toggle joint 200b connect the guide portions 194a and 194b of the housing 194, respectively, to the movable plate 154. As the upper and lower toggle joints 200a, 200b extend, on the one hand, the movable die plate 154 is caused to move toward the fixed die plate 152. As they are operated to contract, on the other hand, the movable die plate 154 is caused to move away from the fixed die plate 152.

The cross head 202 is arranged between the housing 194 and the pair of the upper and lower toggle joints 200a and 200b, and the upper and lower guide portions 194a and 194b pass through the cross head 202 in such a manner as helding slidably the cross head 202. At the upper and lower portions of the cross head 202 are formed an upper curved portion 202a and a lower curved portion 202b, respectively, curved toward the movable die plate 154. The upper curved portion 202a and the lower curved portion 202b are connected, respectively, to the upper toggle joint 200a and the lower toggle joint 200b on the cross head 202 side through an upper link 204a and a lower link 204b.

To the rear surface of the housing 194 is fixed a clamping cylinder 206 that is in turn connected to a hydraulic circuit 208. Hydraulic pressures are supplied through the hydraulic circuit 208 to the clamping cylinder 206 that is provided with a piston rod 206a passing through the housing 194. The tip portion of the piston rod 206a is connected to the cross head 202, thus permitting a displacement of the cross head 202 guided by the guide portions 194a and 194b in the rightward or leftward direction, as in FIG. 31, in association with an expansion or contraction movement of the piston rod 206a. The cross head 202 is further provided on its side of the upper and lower toggle joints 200a and 200b with a support rod 210 extending in a direction toward the movable die plate 154. The support rod 210 is movable in the direction in which it extends and is fixed to the cross head 202. A specimen material 214 to be detected formed, such as, by a metal material or a magnetic material is mounted on the support rod 210.

The switch mounting portion 198 is mounted with proximity switches 212a and 212b in a range under the support rod 210, and the proximity switches 212a and 212b are arranged at predetermined intervals in the extending direction of the support rod 210. The proximity switches 212a and 212b are designed enabling to detect a presence of the specimen material 214 when the specimen material 214 comes at the position upright thereover. The proximity switch 212a, on the one hand, is arranged to be positioned just below the position of the specimen material 214 at the time when an appropriate amount of the clamping force required for the gate cutting is given. The proximity switch 212b, on the other hand, is arranged to be positioned below the position of the specimen material 214 at the time when the movable die plate 154 is brought into abutment with the die M.

Signals from the proximity switches 212a and 212b are supplied to a control circuit 216 functioning as a supplier of control signals to the hydraulic circuit 208 when each of the proximity switches 212a and 212b detects the presence of the specimen material 214. When the proximity switch 212a detects the presence of the specimen material 214 after the clamping of the die M has started being released, the control circuit 216 outputs a control signal for suspending a discharge of hydraulic pressures.

Referring again to FIG. 31, the cross head 202 is moved in the rightward direction by means of the clamping cylinder 206 in order to clamp the die M. This rightward movement of the cross head 202 allows the cross head 202 to bring the upper and lower toggle joints 200a and 200b closer together in the downward and upward directions through the upper and lower links 204a and 204b, respectively. As a result, the upper and lower toggle joints 200a and 200b are caused to extend, thereby pushing the movable die plate 154 toward the die M and then through the die M toward the fixed die plate 152 and clamping the die M between and by the movable die plate 154 and the die fixed die plate 152.

After clamping the die M in the manner as described above, the molding is then effected. As a predetermined period of time has elapsed after effecting the molding, a signal for commencing the gate cutting is supplied to the control circuit 216 that in turn supplies a signal to the hydraulic circuit 208, thereby reducing hydraulic pressures from the clamping cylinder 206 and moving the cross head 202 back toward the leftward direction as shown in FIG. 31. As the hydraulic pressures are decreased to a level appropriate for the gate cutting, the specimen material 214 is caused to be positioned just above the proximity switch 212a by way of a displacement of the cross head 202. Then the proximity switch 212a detects the presence of the secimen material 214 and supplies a signal to the control circuit 216. The control signal is then input to the hydraulic circuit 208 that in turn supplies a signal to suspend a reduction of hydraulic pressures from the claimping cylinder 206.

With this arrangement, the movement of the cross head 202 is suspended while the clamping force is still kept with an appropriate amount of the clamping force for effecting the gate cutting maintained.

It is to be noted in this embodiment that, as an amount of displacement following a transferal of the cross head 202 is detected, a large range of displacement can be utilized for detection of a clamping force required for the gate cutting, thus improving an accuracy of detection. In this embodiment, a limit switch or the like may be used in place of the proximity switches. It is also possible to detect a displacement of the upper and lower toggle joints 200a and 200b.

FIFTH EMBODIMENT (FIGS 32 TO 41)

This embodiment involves automation of the loading of a work grip member 400 for withdrawing a molded product P (hereinafter will be sometimes referred to as the "work") from the die M. For production of small quantities of many kinds of products, it is necessary to load a new work grip member 400a on the arm member 508 corresponding to types (sizes and shapes) of the molded products P.

Figure 32:
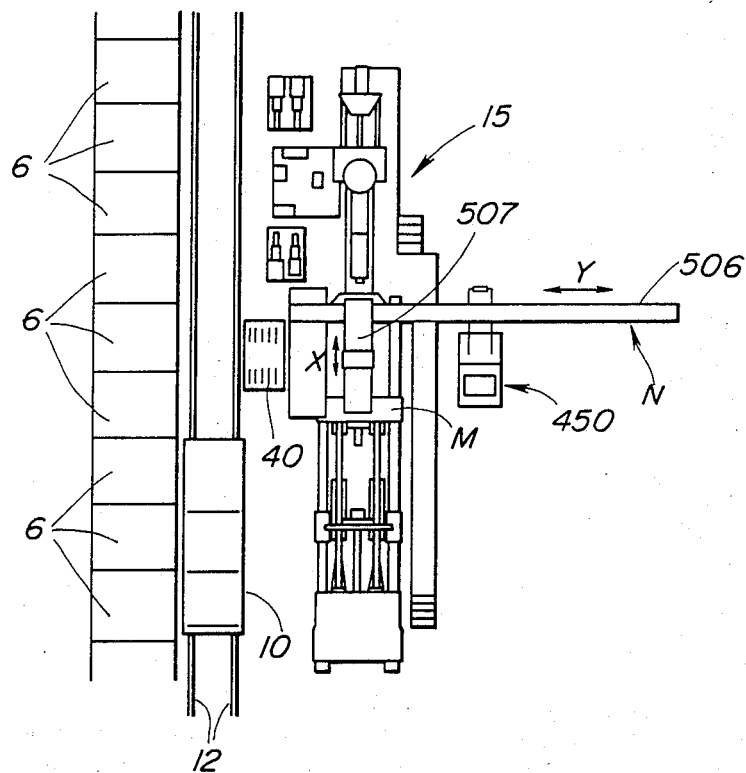
Figure 33:
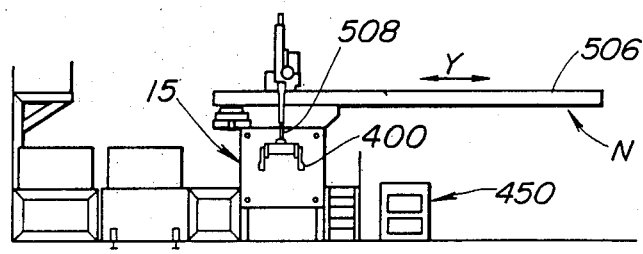
Figure 34:
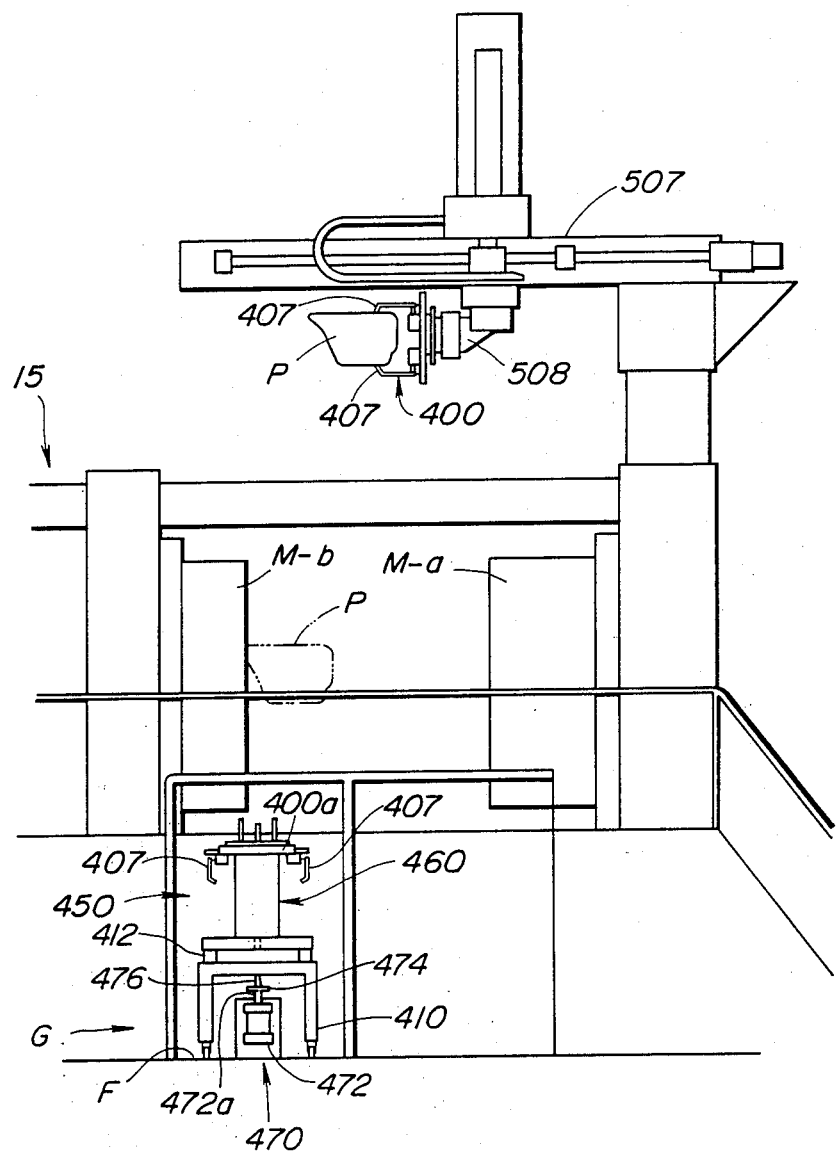

As shown in FIGS. 32 and 33, a work grip member exchanging apparatus 450 is disposed along the molded product withdrawing line N. Turning now to FIG. 34, the work grip member exchanging apparatus 450 is shown to include a support base 460 and a position lifter 470. The support base 460 is to support a new work grip member 400a in a horizontal direction in such a manner as being movable slightly. The position lifter 470 is to lift the support base 460 in an upward direction. The support base 460 on which the new work grip member 400a is loaded is raised by the arm member 508 positioned in a range over a work grip member exchanging station G, thereby leading to the loading of the work grip member 400a.

The support base 460 is then loaded on a carriage 410 in a state that the new work grip member 400a is loaded on the support base 460, and the new work grip member 400a is conveyed by the carriage 410 to the work grip member exchanging station G. The carriage 410 is provided with rolls 412 on its top surface on which the new work grip member 400a is loaded. A movement of the support base 460 is controlled by a stopper 414 mounted on the carriage 410.

Figure 35:
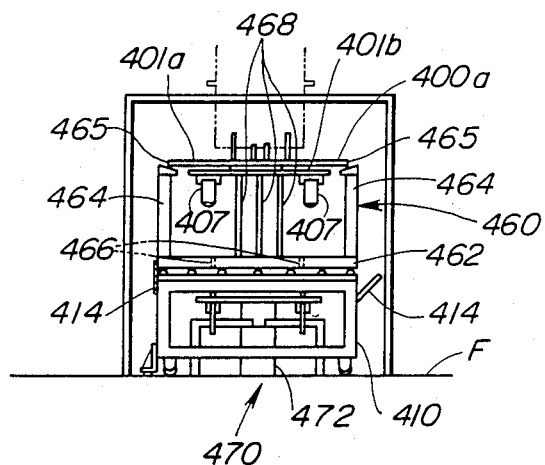
Figure 37:
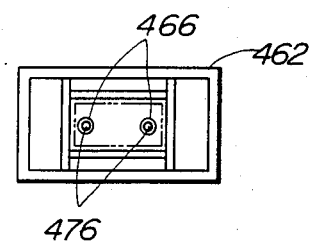
Figure 36:
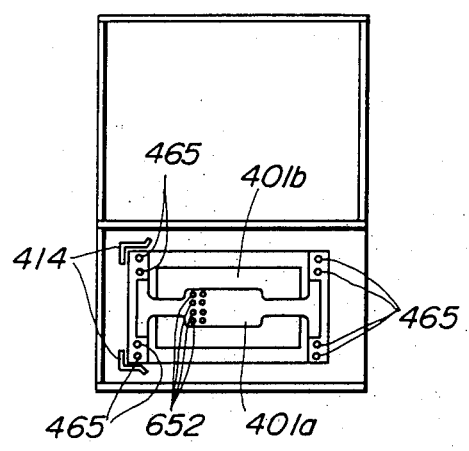
Figure 40:
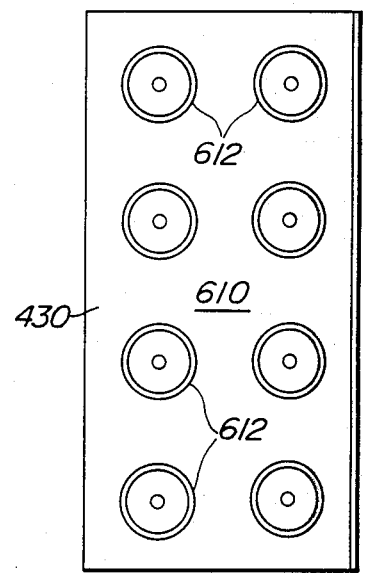

Referring to FIGS. 34 and 35, the work grip member exchanging station G is provided on its floor F with the position lifter 470 that comprises basically a cylinder 472 disposed thereon in an erect position. The top portion of a piston rod 472a extending upwardly from the cylinder 472 is provided with a plate 474 and a position pin 476 extending upwardly from the plate 474. A top portion of the position pin 476 is of a tapered shape and functions as positioning the support base 460 as will be described below.

The support base 460 is shown there to include a base portion 462 and a support portion 464 mounted in an erect position on the side portion of the base portion 462. On the top surface of the base portion 462 is arranged a rolling bearing 465 in a rolling manner so as to support the work grip member 400 movably on its horizontal surface. The support base 460 is provided on its base portion 462 with a position hole 466 for receiving the position pin 476 of the piston rod 472a for the position lifter 470. The position hole 466 has a diameter having substantially the same outer diameter as that of the position pin 476. The base portion 462 of the support base 460 is provided with a second position pin 468 extending in an upward directin. The second position pin 468 is used for temporarily positioning the work grip member 400.

Figure 38:
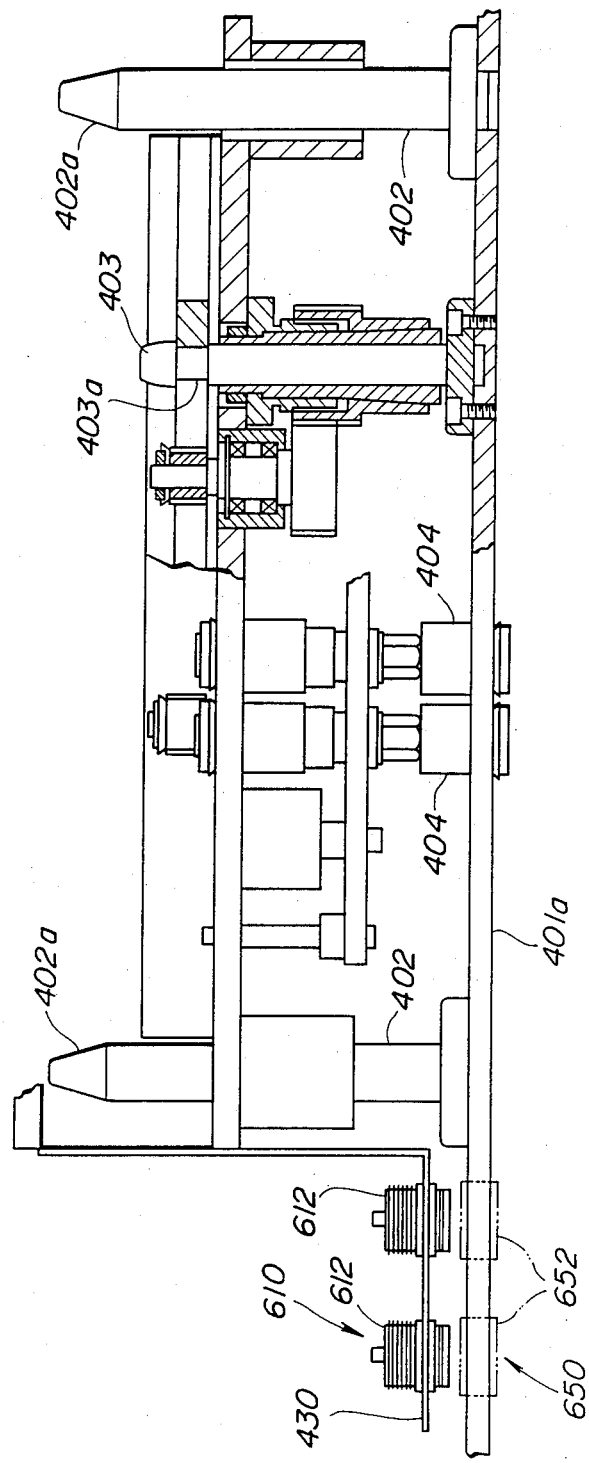
Figure 39:
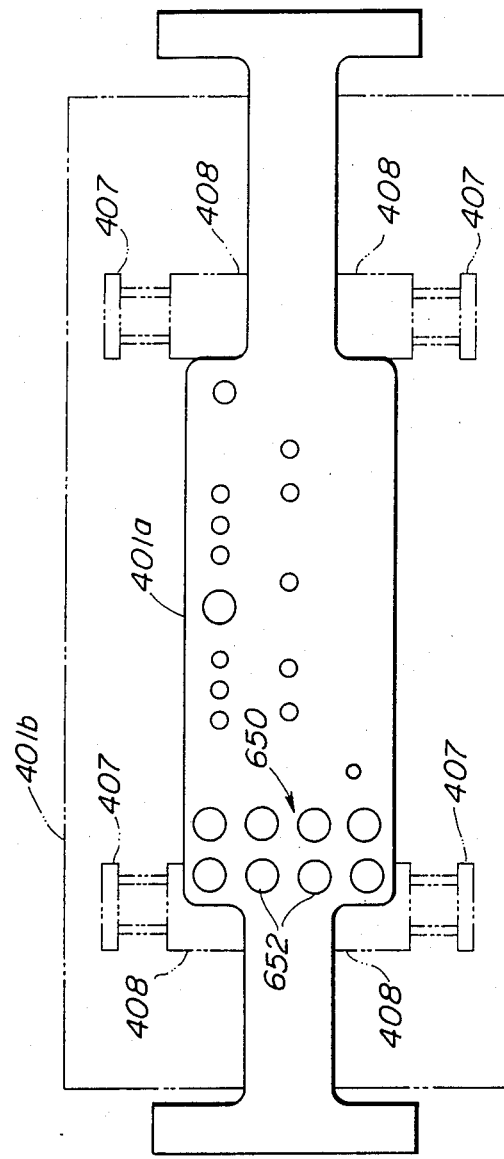

As shown specifically in FIG. 38, the work grip member 400 includes an upper chuck plate 401a and a lower chuck plate 401b. The upper chuck plate 401a is provided with a guide pin 402 with a tapered top portion 402a, an engaging pin 403 being shorter than the guide pin 402 and having a circumferential groove 403a at the top portion, and a connecter 404. These elements 402, 403 and 404 are received by the arm member 508. The upper chuck plate is further provided with a position hole 405 for receiving the second position pin 468 of the support base 460 of the work grip member exchanging apparatus 450. The position hole 405 has a diameter slightly larger than the outer diameter of the second position pin 468 so as to enable receipt of the second position pin 468 in an idling manner. The lower chuck plate 401b is provided with four hands 407 to grip a molded product and each of the hands 407 is operatively opened or closed by a cylinder 408, as shown in FIG. 39.

The arm member 508 is shown to include a guide hole 432 receiving the guide pin 402 mounted on the upper chuck plate 401a of the work grip member 400, a movable plate 434 receiving the engaging pin 403 mounted on the upper chuck plate 401a and engaging with the circumferential groove 403a, and a lock mechanism 436 for locking the engaging pin 403 for prevention against removal therefrom. The lock mechanism 436 is locked or unlocked by a cylinder 438.

With this arrangement, the arm member 508 is first brought to a predetermined position over the work grip member exchanging station G while the support base 460 and the new work grip member 400a are also brought to the work grip member exchanging station G and then raised to a predetermined position by the position lifter 470 in such a state that the new work grip member 400a is loaded on the support base 460. The relative positioning of the support base 460 with respect to the work grip member exchanging staton G, on the one hand, is determined by causing the position pin 476 of the position lifter 470 to insert into the position hole 466 formed on the support base 460. The temporary positioning of the work grip member 400a with respect to the support base 460, on the other, is determined by the idling of the second position pin 468 of the support base 460 with the second position hole 405 formed on the upper chuck plate 401a of the work grip member 400a.

the new work grip member 400a raised together with the support base 460 by the position lifter 470 is positioned relatively with respect to the arm member 508 by causing the guide pin 402 of the new work grip member 400a to be inserted into the guide hole 432 formed on the arm member 508. The position of the new work grip member 400a with respect to the arm member 508 can be modified by a slight movement of the new work grip member 400a on the support base 460.

When the new work grip member 400a has been raised, the engaging pin 403 of the new work grip member 400a is engaged with the movable plate 434 of the arm member 508 and locked by the lock mechanism 436 thereof, thus leading to completion of the loading of the new work grip member 400a on the arm member 508. As have been described above, a series of the loading operation is carried on by means of a raising force of the position lifter 470 so that a connector connection between the work grip member 400 and the arm member 508 is also utilized.

As a result, a careful but laborious control in the loading of the work grip member 400 is no longer required in accordance with this embodiment. In conventional manner, a careful control on the arm member 508 is required for the loading of the work grip member 400 on the arm member 508 by means of a control over the arm member 508. In accordance with this embodiment, such a careful but laborious control in the loading of the work grip member 400 is no longer required and a control system of the arm member 508 can be simplified to a remarkable extent.

Turning now to FIGS. 36, 38, 39 and 40, the arm member 508 is furthr provided with a detection mechanism 610 for detecting identification marks 650 that are formed as through holes 652 on the work grip member 400 for the purpose to identify types of work grip members 400. In this embodiment, the identification marks 650 consists of eight elements that may be conveniently combined with each other in accordance with the type of a new work grip member 400a to be loaded. The detection mechanism 610 consists of proximity switches 612 in the number identical to the number of the identification marks 650, and the proximiity switches 612 are arranged so as to detect the type of the new work grip member 400a in a combination of the on/off switching of the proximity switches 612.

Figure 41:
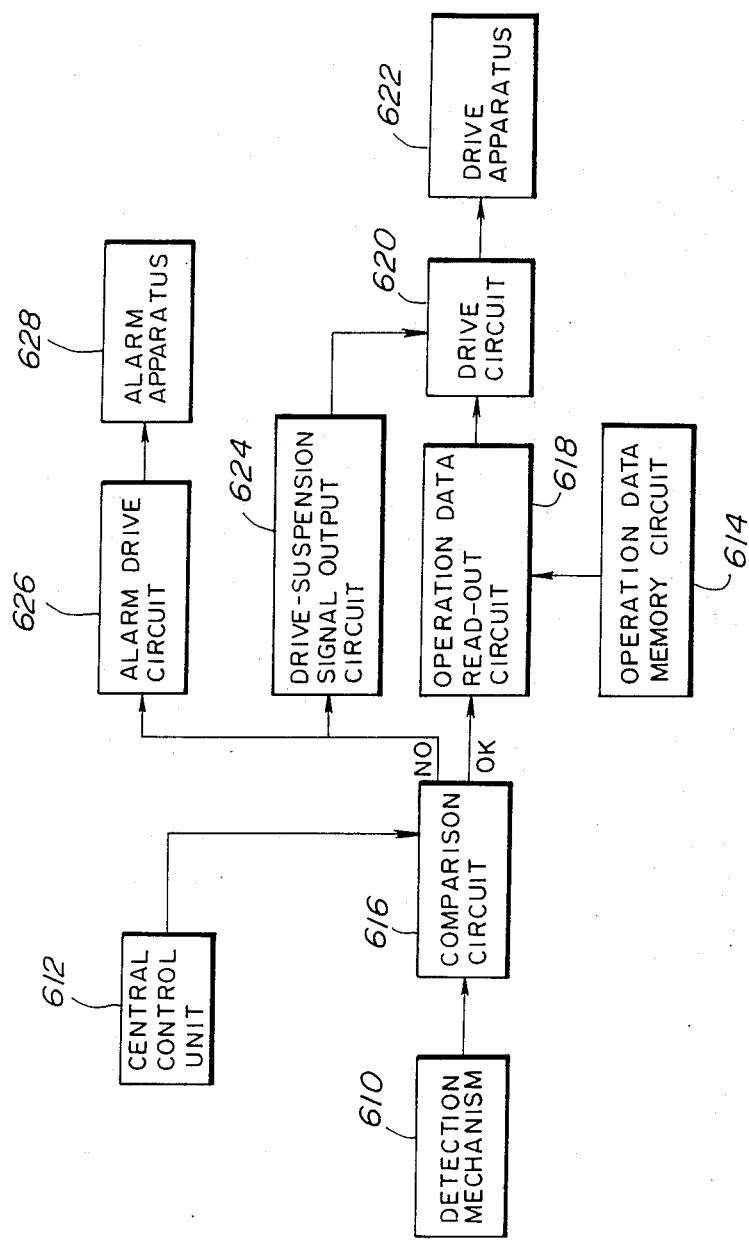

As shown in FIG. 41, a type of the new work grip member 400a loaded on the arm member 508 is detected by the detection mechanism 610. when the molding apparatus 15, the arm member 508 and so on are connected to each other in the on-line control manner by the central control from a central control unit 612, on the one hand, every type of work grip members 400 to be received by the arm member 508 is input in advance. In the central control unit 612, operaton data for the arm member 508 with respect to every type of the work grip member 400 are memorized in an operation data memory circuit 614. The detection results on the type of the new work grip member 400a to be received by the arm membr 508 and the detection mechanism 610 are compared by a comparison circuit 616.

When it is found identical to each other as a result from the comparison by the comparison circuit 616, on the one hand, the operation data for the operation of the arm member 508 to be followed are read out by an operation data read-out circuit 61. Based on the operation data, a drive circuit 620 is turned on to operate a drive apparatus 622, thereby operating the arm member 508 to withdraw molded products. When it is found unmatched with each other, on the other, the operaton of the arm member 508 to otherwise follow is suspended in accordance with a signal supplied by a drive suspension signal output circuit 624, thus causing an alarm drive circuit 626 to come an alarm apparatus 628 on and off.

With such a control arrangement as have been described, the type of a new work grip member 400a to be loaded by the arm member 508 is checked in two ways including the detection by the detection mechanism 610 arranged in the arm member 508, thereby leading to a secured prevention against the loading of a wrong work grip member on the arm member 508.

When the molding apparatus 15, the arm member 508 and so on are controlled individually on an off-line control system, on the other hand, operation data for the operation of the arm member 508 to follow is given utilizing the identification marks 650. When the new work grip member 400a is loaded on the arm member 508, the detection mechanism 510 recognizes the identification marks 650, then detecting the type of the new work grip member 400a. The detection result from the detection mechanism 610 is input to the central control unit 612, and the operation data for the operation data memory circuit 614 is read out by the operation data read-out circuit 618. The arm member 508 is then controlled in the same manner as described immediately above.

From the foregoing, it is to be understood that the identification marks 650 serve substantially as an input means of operation data on the arm member 508 corresponding to each of new work grip members 400a. Accordingly, even for an on-line system, laborious work on input of operation data in a control circuit of the hand member 430 corresponding to each of the new work grip member 400a can be avoided.

It is further to be noted that this technique is applicable to the die exchanging operation in the molding apparatus.

What is claimed is:

1. A molding installation using a die, comprising:
   a molding apparatus for effecting the molding with the die;
   a stocker having means for storing the die;
   a die carriage positionable to transfer the die between the carriage and the molding apparatus and between the carriage and the stocker, said carriage having a table for supporting the die and being movable on a path interposed between the molding apparatus and the stocker, said path being located a distance farther from the molding apparatus than from the stocker;
   a first die replacing means mounted on the molding apparatus for transferring the die to and from the carriage, and
   a second die replacing means mounted on the carriage for transferring the die to and from the stocker.

2. The molding installation according to claim 1, wherein an intermediate table is arranged between the molding apparatus and the carriage.

3. The molding installation according to claim 2, wherein the carriage comprises a frame and two tables located on the frame and movable in a direction parallel to the path relative to the frame.

4. The molding installation according to claim 1, wherein the first die replacing means comprises a pusher and a hook, the pusher being designed so as to be extendable or contractible to transfer the die between the molding apparatus and the carriage, the hook being disposed on a tip portion of the pusher so as to be engageable with the die.

5. The molding installation according to claim 4, wherein an intermediate table is arranged between the molding apparatus and the carriage.

6. The molding installation according to claim 1, further comprising a die temperature adjusting apparatus for pre-heating the die disposed along the path for the carriage, wherein the second die replacing means is positionable to transfer the die from and to the die temperature adjusting apparatus.

7. The molding installation according to claim 6, wherein the die temperature adjusting apparatus comprises a first plate, a second plate, and a drive means, the first plate being mountable with one half of the die of a separate type, the second plate being mountable with the other half thereof, and the drive means being operable to drive the first and second plates so as to come closer to each other or go apart from each other; and
   the temperature adjusting apparatus further comprises a plate space controlling means for controlling a space between the first and second plates so as to reach a preset value determined to accept the die in accordance with a kind of die prior to the loading of the die into the space therebetween by controlling the drive means, a die thickness detecting means for detecting a die thickness of the die being loaded into the space therebetween, and a loading suspending means for suspending the loading of the die when a die thickness of the die detected by the die thickness detecting means is larger than the preset value.

8. The molding installation according to claim 7, wherein the die thickness detecting means comprises a detecting rod extending toward the die being loaded and an output means for supplying a signal that the die thickness of the die is larger than the present value when said detecting rod comes into abutment with the die.

9. The molding installation according to claim 1, wherein the molding apparatus comprises a first plate mountable with one half of the die of a separate type, a second plate mountable with the other half thereof, and a drive means for driving the first and second plates so as to come closer to each other or go apart from each other; and
   the molding apparatus further comprises a plate space controlling means which controls a space between the first and second plates so as to reach a preset value determined to accept the die in accordance with a kind of die prior to the loading of the die into the space therebetween by controlling the drive means.

10. The molding installation according to claim 9, wherein the molding apparatus is provided with a die thickness detecting means for detecting a die thickness of the die being loaded into the space therebetween, and a loading suspending means for suspending the loading of the die when a die thickness of the die detected by the die thickness detecting means is larger than the preset value.

11. The molding installation according to claim 10, wherein the die thickness detecting means comprises a detecting rod extending toward the die being loaded and an output means for supplying a signal that the die thickness of the die is larger than the preset value when said detecting rod comes into abutment with the die.

12. A molding installation using a die, comprising:
   a molding apparatus for effecting the molding with the die;
   a plurality of stockers adapted to store the die;
   a carriage adapted to load or unload the die to or from the molding apparatus or the stocker, said carriage having a table for supporting the die and being movable on a path interposed between the molding apparatus and the stocker, said path being located in a distance farther from the molding apparatus than from the stocker;
   a first die replacing means mounted on the molding apparatus for loading or unloading the die to or from the carriage, a second die replacing means mounted on the carriage for loading or unloading the die to or from the stocker, and an intermediate table fixed between the molding apparatus and the carriage, the intermediate table being provided with plural rollers disposed in a direction parallel to a direction in which the die is transferred.

13. The molding installation according to claim 12, wherein the molding apparatus comprises a first plate mountable with one half of the die of a separate type, a second plate mountable with the other half thereof and a drive means for driving the first and second plates so as to come closer to each other or go apart from each other; and the molding apparatus further comprises a plate space controlling means which controls a space between the first and second plates so as to reach a preset value determined to accept the die in accordance with a kind of die prior to the loading of the die into the space therebetween by controlling the drive means.

14. The installation according to claim 12, wherein the carriage comprises a frame and two tables located on the frame and movable in a direction parallel to the path relative to the frame.

15. The molding installation according to claim 14, wherein the first die replacing means comprises a pusher and a hook, the pusher being designed so as to be extendable or contractable from or to the molding apparatus to or from the carriage and the hook being disposed on a tip portion of the pusher so as to be engageable with the die.

16. A molding installation using a die, comprising:
a molding apparatus for effecting the molding with the die;
a stocker having means for storing the die;
a die carriage positionable to transfer the die between the carriage and the molding apparatus and between the carriage and the stocker, said carriage being disposed a distance away from the molding apparatus so as to run on a path connecting the molding apparatus to the stocker and being provided with a table on which the die is loaded;
a first die replacing means mounted on the molding apparatus for transferring the die to and from the carriage, comprising a pusher extendable or contractible to transfer the die between the molding apparatus and the carriage and a hook mounted on a tip portion of the pusher so as to be engageable with the die;
a second die replacing means mounted on the carriage for transferring the die to and from the stocker.

17. The molding installation according to claim 16, further comprising an intermediate table disposed between the molding apparatus and the carriage, wherein said carriage comprises a frame and two tables disposed on the frame and movable relative to the frame in a direction in which the carriage runs on the path.

18. A molding installation using a die, comprising:
a molding apparatus for effecting the molding with the die;
a stocker having means for storing the die;
a die conveying carriage positionable to exchange the die in the molding apparatus and running on a passage connecting between the molding apparatus and the stocker and having a table for supporting the die thereon;
die conveying means mounted on the molding apparatus and positionable to transfer the die to and from the die conveying carriage; and
die conveying means mounted on the die conveying carriage and positionable to transfer the die to and from the stocker;
wherein the molding apparatus comprises a first plate and a second plate in such a manner that the die is introduced into a space between the first and second plates with one mold half of the die loaded on a side of the first plate and the other mold half loaded on a side of the second plate, said molding apparatus further comprising a drive means for driving the second plate closer to or far away from the first plate;
the molding apparatus further comprises a plate space controlling means and a die thickness detecting means in such a manner that conveyance of the die into the molding apparatus is suspended when a die thickness of the die detected by the die thickness detecting means is larger than a value preset in accordance with the type of the die;
said plate space controlling means for controlling the space between the first and second plates of the molding apparatus controls said drive means so that the space becomes a value preset prior to conveyance of the die thereinto in accordance with a type of the die to be conveyed into the space therebetween; and
said die thickness detecting means is for detecting a die thickness of the die in the course of conveyance into the space therebetween.

19. The molding installation according to claim 18, wherein the die thickness detecting means comprises a detecting rod extending toward the die in the course of conveyance, said detecting rod designed so as to supply a signal that the die thickness of the die in the course of conveyance is larger than the preset value when said detecting rod is caused to abut with the die in the course of conveyance.

* * * * *